(12) United States Patent
Reszczynski et al.

(10) Patent No.: US 12,154,155 B2
(45) Date of Patent: *Nov. 26, 2024

(54) TECHNIQUES FOR CONFIGURABLE PART GENERATION

(71) Applicant: Partfiniti Inc., Haymarket, VA (US)

(72) Inventors: Lukasz Marcin Reszczynski, Kórnica (PL); Geoffrey Peter Laycock, Haymarket, VA (US)

(73) Assignee: Partfiniti Inc., Haymarket, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/218,267

(22) Filed: Jul. 5, 2023

(65) Prior Publication Data

US 2024/0005373 A1    Jan. 4, 2024

Related U.S. Application Data

(60) Continuation of application No. 17/382,605, filed on Jul. 22, 2021, now Pat. No. 11,734,741, which is a
(Continued)

(51) Int. Cl.
  *G06F 16/903*  (2019.01)
  *G06F 16/248*  (2019.01)
  (Continued)

(52) U.S. Cl.
  CPC ....... *G06Q 30/0621* (2013.01); *G06F 16/248* (2019.01); *G06F 16/287* (2019.01);
  (Continued)

(58) Field of Classification Search
  CPC .... G06F 16/245; G06F 16/248; G06F 16/285; G06F 16/90344; Y10S 707/948;
  (Continued)

(56) References Cited

U.S. PATENT DOCUMENTS

| | | | | |
|---|---|---|---|---|
| 4,870,591 A | * | 9/1989 | Cicciarelli | G06F 16/904 706/904 |
| 5,500,802 A | * | 3/1996 | Morris | G06F 9/4488 700/182 |

(Continued)

FOREIGN PATENT DOCUMENTS

| | | | | |
|---|---|---|---|---|
| JP | 2003281199 A | * | 10/2003 | G06F 17/50 |
| JP | 2007239700 A | * | 9/2007 | |

OTHER PUBLICATIONS

"Approaches to Hierarchical Facets in SOLR", http://wiki.apache.org/solr/HierarchicalFaceting?action-print, pp. 1-5, last edited Apr. 28, 2014; retrieved May 5, 2015.

*Primary Examiner* — Dennis Truong
(74) *Attorney, Agent, or Firm* — Nixon & Vanderhye, P.C.

(57) ABSTRACT

Certain example embodiments relate to techniques generating a database of virtual families for real-time generation of part numbers for configurable products. For instance, certain example embodiments may include receiving a search request for part numbers and determining virtual families including entities matching the search request. The number of matching products matching the search request and the part numbers may be determined based on the virtual families and the independent groups stored in the virtual families that match the search request. The part numbers may be determined based on allowed characters, number and/or symbols for the part number positions defined in the independent groups of the virtual families including the entities matching the one or more configurable properties of the user input search request. Facet counts for the configurable product may also be determined based on the results of the user input search request.

20 Claims, 29 Drawing Sheets

Related U.S. Application Data continuation of application No. 16/153,381, filed on Oct. 5, 2018, now Pat. No. 11,087,375, which is a division of application No. 14/704,636, filed on May 5, 2015, now Pat. No. 10,121,177.

(51) Int. Cl.
*G06F 16/28* (2019.01)
*G06F 16/951* (2019.01)
*G06Q 30/0601* (2023.01)

(52) U.S. Cl.
CPC ...... *G06F 16/90344* (2019.01); *G06F 16/951* (2019.01); *G06Q 30/0625* (2013.01); *G06Q 30/0641* (2013.01)

(58) Field of Classification Search
CPC ........... G06Q 10/0875; G06Q 30/0601; G06Q 30/0223; G06Q 30/0603
See application file for complete search history.

(56) References Cited

U.S. PATENT DOCUMENTS

| | | | |
|---|---|---|---|
| 6,438,535 B1 | 8/2002 | Benjamin | |
| 6,647,305 B1* | 11/2003 | Bigelow | G06F 30/00 |
| | | | 700/182 |
| 6,810,401 B1* | 10/2004 | Thompson | G06Q 30/02 |
| | | | 707/999.102 |
| 6,871,198 B2 | 3/2005 | Neal et al. | |
| 7,167,876 B2 | 1/2007 | Cookson et al. | |
| 7,634,482 B2 | 12/2009 | Mukherjee et al. | |
| 7,680,704 B2* | 3/2010 | Ouchi | G06Q 10/0875 |
| | | | 705/29 |
| 7,685,139 B2 | 3/2010 | Atkinson et al. | |
| 7,725,364 B2* | 5/2010 | Tanaka | G06Q 30/0641 |
| | | | 705/27.1 |
| 8,050,958 B2* | 11/2011 | Woehler | G06Q 10/06315 |
| | | | 705/7.25 |
| 8,249,885 B2* | 8/2012 | Berkowitz | G06Q 30/0625 |
| | | | 705/1.1 |
| 8,306,795 B2 | 11/2012 | Atkinson | |
| 8,805,825 B1* | 8/2014 | Showers | G06F 16/90335 |
| | | | 707/723 |
| 10,672,047 B2* | 6/2020 | Swanson | G06Q 30/0601 |
| 11,599,925 B1* | 3/2023 | Ashby | G06Q 30/0621 |
| 2001/0044758 A1* | 11/2001 | Talib | G06F 16/3323 |
| | | | 705/26.1 |
| 2002/0073001 A1* | 6/2002 | Palmer | G06Q 10/0875 |
| | | | 705/29 |
| 2002/0107763 A1* | 8/2002 | Palmer | G06Q 30/02 |
| | | | 705/29 |
| 2003/0090527 A1 | 5/2003 | Kamino | |
| 2003/0149706 A1* | 8/2003 | Neal | G06Q 30/06 |
| 2003/0172003 A1* | 9/2003 | Holbrook | G06Q 10/087 |
| | | | 705/26.1 |
| 2004/0068444 A1 | 4/2004 | Chien et al. | |
| 2004/0254864 A1* | 12/2004 | Mitsuoka | G06Q 10/0875 |
| | | | 705/29 |
| 2004/0267636 A1* | 12/2004 | Ouchi | G06Q 10/0875 |
| | | | 705/27.1 |
| 2005/0138078 A1* | 6/2005 | Christenson | G06Q 30/0641 |
| 2005/0222700 A1* | 10/2005 | Itano | G06Q 10/00 |
| | | | 700/106 |
| 2005/0283410 A1* | 12/2005 | Gosko | G06Q 30/06 |
| | | | 705/26.5 |
| 2006/0052895 A1* | 3/2006 | Woehler | G06Q 10/08 |
| | | | 700/107 |
| 2006/0100889 A1* | 5/2006 | Gosko | G06Q 30/0601 |
| | | | 705/26.1 |
| 2006/0178944 A1* | 8/2006 | Katter | G06Q 30/0603 |
| | | | 705/26.1 |
| 2006/0218156 A1* | 9/2006 | Schechinger | G06F 16/957 |
| 2006/0288000 A1* | 12/2006 | Gupta | G06F 16/9535 |
| | | | 707/999.005 |
| 2007/0094239 A1 | 4/2007 | Catucci et al. | |
| 2007/0233654 A1* | 10/2007 | Karlson | G06F 16/40 |
| 2007/0239700 A1* | 10/2007 | Ramachandran | H04L 41/0866 |
| | | | 707/999.005 |
| 2007/0276880 A1* | 11/2007 | Lu | G06Q 30/0214 |
| | | | 707/999.203 |
| 2008/0041950 A1 | 2/2008 | Michels | |
| 2008/0109463 A1* | 5/2008 | Atkinson | G06Q 10/087 |
| 2008/0126221 A1* | 5/2008 | Swanson | G06Q 30/0643 |
| | | | 705/26.5 |
| 2008/0243798 A1* | 10/2008 | Otsuki | G06F 16/90344 |
| 2011/0098835 A1* | 4/2011 | Yucel | G06F 30/15 |
| | | | 707/769 |
| 2011/0098837 A1* | 4/2011 | Yucel | G06F 30/17 |
| | | | 700/107 |
| 2013/0041786 A1* | 2/2013 | Adegan | G06Q 40/08 |
| | | | 705/29 |
| 2014/0365943 A1* | 12/2014 | Senesac | G06F 3/04842 |
| | | | 715/771 |
| 2015/0066674 A1* | 3/2015 | Liu | H04L 67/01 |
| | | | 705/26.1 |
| 2015/0199470 A1* | 7/2015 | Young | G06F 30/15 |
| | | | 700/98 |
| 2016/0063430 A1* | 3/2016 | Poncher | G06Q 10/087 |
| | | | 705/28 |
| 2016/0063595 A1* | 3/2016 | Oral | G06Q 30/0621 |
| | | | 705/26.7 |
| 2016/0328777 A1* | 11/2016 | Clendinning | G06Q 30/0631 |

* cited by examiner

200

300

400

500

600

Virtual Family #1

Independent Group #1

| # of Fibers | Fiber Name | Brand Name | n_1 | n_2 | n_3 | n_4 | n_5 |
|---|---|---|---|---|---|---|---|
| 2 | OM1 | SUPERCABLE | A | B | S | 2 | C |
| 6 | OM1 | SUPERCABLE | A | B | S | 6 | C |

Independent Group #2
Values 100 to 1000

Virtual Family #2

Independent Group #1

| # of Fibers | Fiber Name | Brand Name | n_1 | n_2 | n_3 | n_4 | n_5 |
|---|---|---|---|---|---|---|---|
| 2 | OM1 | XCABLE | A | B | X | 2 | C |

Independent Group #2
Values 1 to 1000

Virtual Family #3

Independent Group #1

| # of Fibers | Fiber Name | Brand Name | n_1 | n_2 | n_3 | n_4 | n_5 |
|---|---|---|---|---|---|---|---|
| 4 | OM1 | SUPERCABLE | A | B | S | 4 | |

Independent Group #2
Values 100 to 1000

Virtual Family #4

Independent Group #1

| # of Fibers | Fiber Name | Brand Name | n_1 | n_2 | n_3 | n_4 | n_5 |
|---|---|---|---|---|---|---|---|
| 8 | OM2 | SUPERCABLE | | | S | 8 | |

Independent Group #2
Values 1 to 1000

FIG. 7

```
Family: 1                    Family: 1                    Family: 1
Virtual Family: 1            Virtual Family: 1            Virtual Family: 1
Independent Group: 1         Independent Group: 1         Independent Group: 1 n_1: A                       n_1: A                       n_1: A
n_2: B                       n_2: B                       n_2: B
n_5: G                       n_5: H                       n_5: P

Brand: XCABLE                Brand: PLUS                  Brand: NAME
# Fibers: 12                 # Fibers: 36                 # Fibers: 12
Color: <in_other_group>      Color: <in_other_group>      Color: <in_other_group>

Family: 1                    Family: 1
Virtual Family: 1            Virtual Family: 1
Independent Group: 2         Independent Group: 2 n_3: F                       n_3: A
n_4: B                       n_4: B
n_6: C                       n_6:

Brand: <in_other_group>      Brand: <in_other_group>
# Fibers: <in_other_group>   # Fibers: <in_other_group>
Color: Black                 Color: Yellow Family: 1                    Family: 1
Virtual Family: 2            Virtual Family: 2
Independent Group: 1         Independent Group: 1

Brand: XCABLE                Brand: ABCDE
# Fibers: 12                 # Fibers: 36
Color: Green                 Color: Red
```

Initial Data From Search Query

Offset: 2,000
Limit: 3
Sort: number ASC

Number of parts matching search query
    <u>Family 1:Virtual Family 1</u>
        Group #1: 100
        Group #2: 2
        Group #3: 5
        Group #4: 1
        Total: 100*2*5*1=1,000
    <u>Family 3:Virtual Family 4</u>
        Group #1: 7,500
        Total: 7,500
    <u>Family 11:Virtual Family 110</u>
        Group #1: 500
        Group #2: 10
        Total: 500*10=5,000

First Iteration
    From the search results determine symbols allowed at first part number position

| P | Q | R |
|---|---|---|
| 1-1: 1,000 | 1-1: 0 | 1-1: 0 |
| 3-4: 0 | 3-4: 7,500 | 3-4: 0 |
| 11-110: 0 | 11-110: 2,500 | 11-110: 2,500 |

Second Iteration
    From the search results determine symbols allowed at second part number position

| QA | QB |
|----|----|
| 3-4: 7,500 | 3-4: 0 |
| 11-110: 0 | 11-110: 2,500 |

Third Iteration
    From the search results determine symbols allowed at third part number position

| QA0 | QA1 | QA2 | QA3 | QAD |
|-----|-----|-----|-----|-----|
| 3-4: 1000 | 3-4: 1 | 3-4: 1 | 3-4: 1 | 3-4: 6497 |

Fourth Iteration
    From the search results determine symbols allowed at fourth part number position

| QA3H |
|------|
| 3-4: 1 |

TECHNIQUES FOR CONFIGURABLE PART GENERATION

CROSS-REFERENCE TO RELATED APPLICATIONS

This application is a continuation of U.S. patent application Ser. No. 17/382,605, filed Jul. 22, 2021, which is a continuation of U.S. patent application Ser. No. 16/153,381 filed Oct. 5, 2018, now U.S. Pat. No. 11,087,375, issued Aug. 10, 2021, which is a division of U.S. patent application Ser. No. 14/704,636 filed May 5, 2015 now U.S. Pat. No. 10,121,177. The disclosure of the prior application is incorporated herein in its entirety by reference.

TECHNICAL FIELD

Certain example embodiments described herein relate to systems and/or methods for generating, storing, and retrieving data that can be used to generate part numbers for a configurable product. More particularly, certain example embodiments described herein relate to systems and/or methods for real-time generation of part numbers and/or specification information for a configurable product based on rules that do not require storing a part number for each possible configuration of the configurable product.

BACKGROUND AND SUMMARY

Suppliers of products manage product databases that store records of their products. Some of the products are configurable products with product features that can be configured to meet specific requirements. Product databases with configurable product include a list of product part numbers that reflect every possible combination of product features. Based on the list, the customer may select a product having features that match the customer's needs. The customer may also select features that the product needs to have and the records in the product database may be searched to find configured products matching the customer's selections.

Cables are an example of a configurable product. The supplier may generate a database with records of different cable configurations. A customer may select a cable from the database with the desired features (e.g., cable length, cable color, cable type, type of connectors, number of connectors, or type of shielding). The customer may also be provided with a user interface to select desired features of the cable and, based on the selections, be provided with configured cables from the database that match the selections.

However, as the number of possible features of a product increases, the size and complexity of the product database exponentially increases. The large number of records reduces the speed with which the results can be returned to a customer and makes it more difficult to present the results efficiently.

Certain example embodiments of this application address these and/or other concerns. For instance, certain example embodiments relate to a computer implemented method for processing a search request for part numbers of a configurable product. The method may include displaying a user interface for receiving a user input search request for the part numbers of the configurable product and receiving, via the user interface, the user input search request defining one or more configurable properties of the configurable product. The method may include analyzing the user input search request to determine entities present in a database matching the one or more configurable properties of the user input search request, and determining virtual families stored in the database including the entities. Each virtual family may include one or more independent groups defining configurable properties of the configurable product and part number positions of the part number corresponding to the configurable properties. Each independent group may include part number positions of the part number for characters, number and/or symbols that do not depend on characters, number and/or symbols at part number positions of other independent groups. Based on the determined virtual families including the entities, a calculation may be made to determine a total number of matching products. In addition, the method may include determining the part numbers of the configurable product matching the user input search request, wherein the part numbers are determined based on allowed characters, number and/or symbols for the part number positions defined in the independent groups of the virtual families including the entities matching the one or more configurable properties of the user input search request. A list of part numbers determined to match the user input search request may be displayed to a user on the user interface.

According to an embodiment of the present disclosure, the independent groups are generated by receiving specification information for the configurable product, generating an independent group for each symbol group, merging independent groups having the same configurable properties to form a new independent group; and merging independent groups that, based on at least one constraint, dependent on each other, wherein the dependent independent groups are merged to form a new independent group. The received specification information may include a plurality of symbol groups for the configurable product. The received specification information may also include at least one constraint involving at least one symbol group. The symbol groups define a format of the part number of the configurable product and each symbol group includes one or more part number positions of the part number for the characters, number and/or symbols corresponding to the configurable properties of the configurable product.

According to an embodiment of the present disclosure, the possible part number positions formed based on the independent groups of one virtual family have a same length.

Certain example embodiments of the present disclosure relate to a computer implemented method for building a configurable product data store. The method including receiving specification information for a configurable product and, based on the specification information, generating a plurality of independent groups. The specification information includes at least one symbol group for the configurable product. The specification information may also include at least one constraint involving at least one symbol group, and/or at least one conditional particular for at least one symbol group. The symbol group(s) may define a format of a part number of the configurable product and each symbol group includes one or more part number positions of the part number for characters, number and/or symbols corresponding to configurable properties of the configurable product. Each independent group includes part number positions for characters, number and/or symbols that do not depend on characters, number and/or symbols at part number positions of other independent groups. The plurality of independent groups are generated by generating an independent group for each symbol group, merging independent groups having the same configurable properties to form a new independent group, and merging independent groups that, based on the at least one constraint, dependent on each other, wherein the dependent independent groups are merged to form a new independent group. When multiple lengths of the part number positions can be generated from the generated independent groups, a plurality of virtual families are generated such that each respective virtual family, based on the independent groups in the virtual family, provides characters, number and/or symbols for part number positions that are of a same length. The generated virtual families are stored a database.

Non-transitory computer readable storage mediums tangibly storing instructions for performing the above-summarized and/or other approaches also are provided by certain example embodiments, as well as corresponding computer programs.

These features, aspects, advantages, and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which:

FIG. 7 illustrates virtual families with corresponding independent groups generated in response to a constraint according to an embodiment of the present disclosure;

FIG. 9 illustrates a flat view of the meta data for a first family according to an embodiment of the present disclosure;

FIG. 11 illustrates iterative steps that may be made to determine the part number of parts to be returned according to an embodiment of the present disclosure.

DETAILED DESCRIPTION

Figure 1:
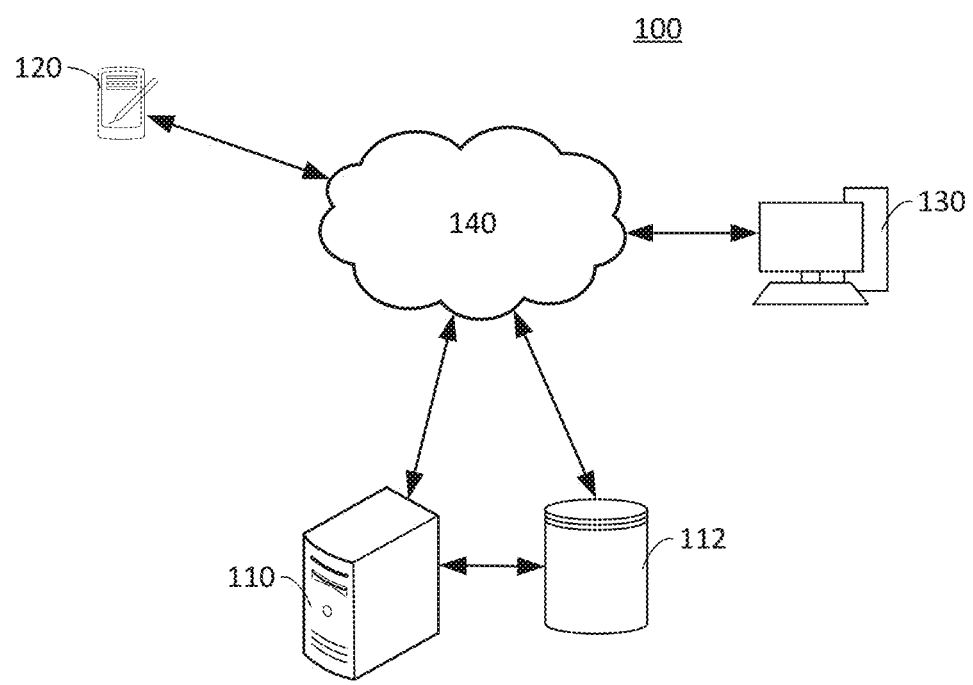
FIG. 1 is a block diagram illustrating a system in accordance with an embodiment of the present disclosure.

FIG. 1 is a block diagram illustrating a system 100 in accordance with an embodiment of the present disclosure. The system of FIG. 1 may provide part numbers and specifications for configurable products. As shown in FIG. 1, a server 110 may communicate with one or more user devices 120 and one or more supplier devices 130. The components of the system 100 may be coupled to each via a communication link 140. The server 110 may also be coupled directly or via the communication link 140 to a database 112.

The server 110 may receive information about configurable products from a supplier device 130 and process the data to build a data store to provide information about configurable products. The data store may be stored in the database 112. The data store may be used to generate part numbers and/or specifications of configured products on the fly. As discussed in more detail below, a part number builder may process the received information about the configurable products to generate a set of rules that are used to generate the part numbers and/or specification information for the configured parts. By generating and storing the rules instead of each possible configurable part number and all of the part's data, the size of the required database 112 is not depend on the number of parts. Accordingly, the size of the database does not exponentially increase as the number of configurable product features increases. In addition, the part numbers can be provided quickly and efficiently without significant delay attributed to searching large databases. The database 112 may also store full data for parts added or modified manually. The database 112 may include a plurality of different databases dedicated for specific application. For example, a first database may include data (e.g., rules) for generating part numbers and a second database may include specification data (e.g., specification documentation, images, part descriptions). One or more of the databases may be a relational database.

The part numbers and the specifications of the configured product may be provided in response to user requests made on the user device 120. The user requests may be made via a user interface provided on the user device 120. The user interface may be provided via an application stored on the user device 120 or may be provided on the user device 120 via a webpage (e.g., maintained by the server 120). As the user makes selections of product configurations, a list of product part numbers matching the selections can be displayed based on the rules stored in the database 112. The available selections for configuring the product may be modified (e.g., removed or limited) based on the rules in response to already selected configurations of the product. The user may select one or more of the product part numbers to receive specification information and/or ordering details (e.g., price and/or availability).

Figure 2:
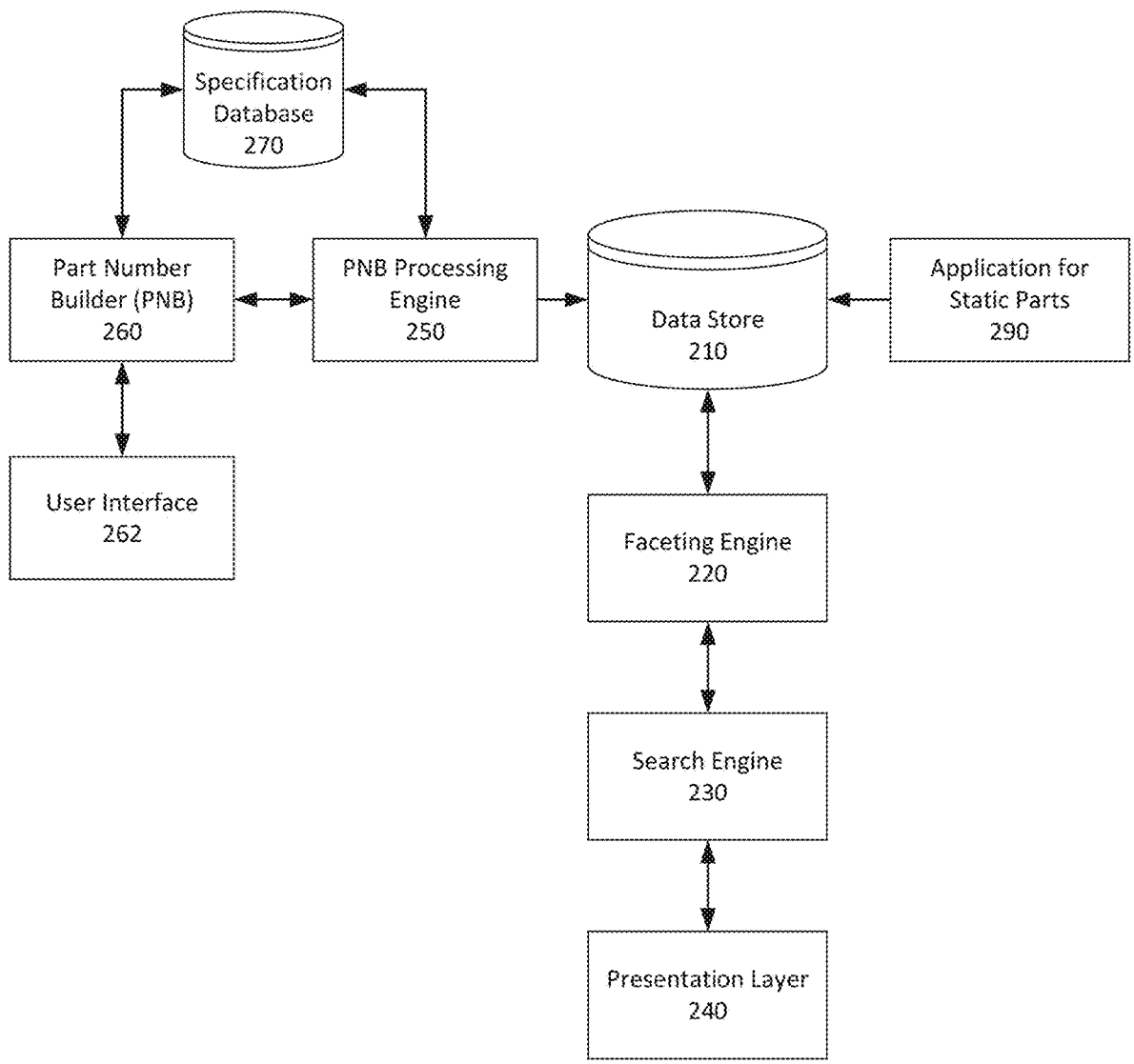
FIG. 2 illustrates an exemplary system for building a data store and providing part numbers for configurable products based on data stored in the data store according to an embodiment of the present disclosure.
Figure 12A:
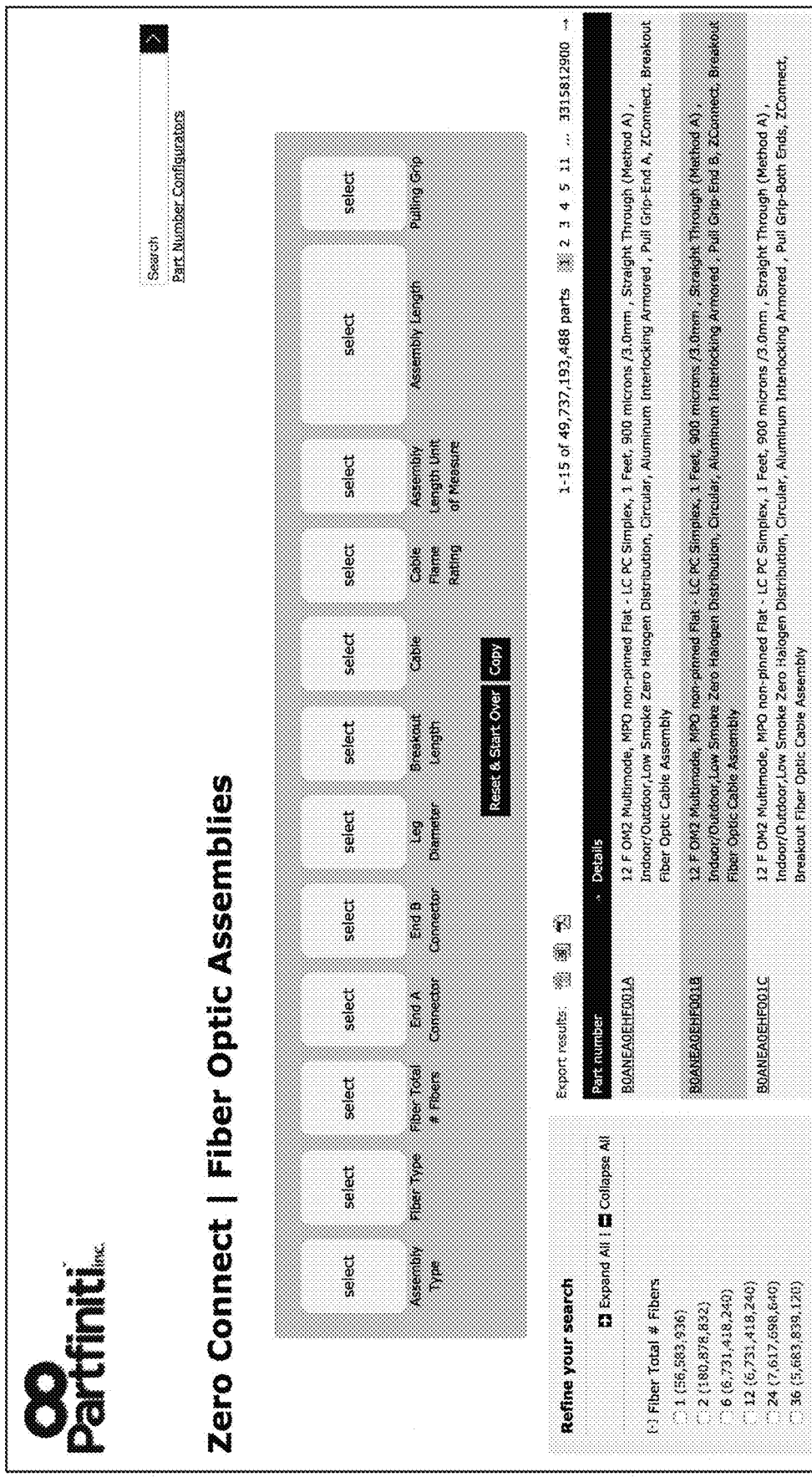
FIGS. 12A-12R illustrate the process of making selections of a configurable product according to an embodiment of the present disclosure.
Figure 12B:
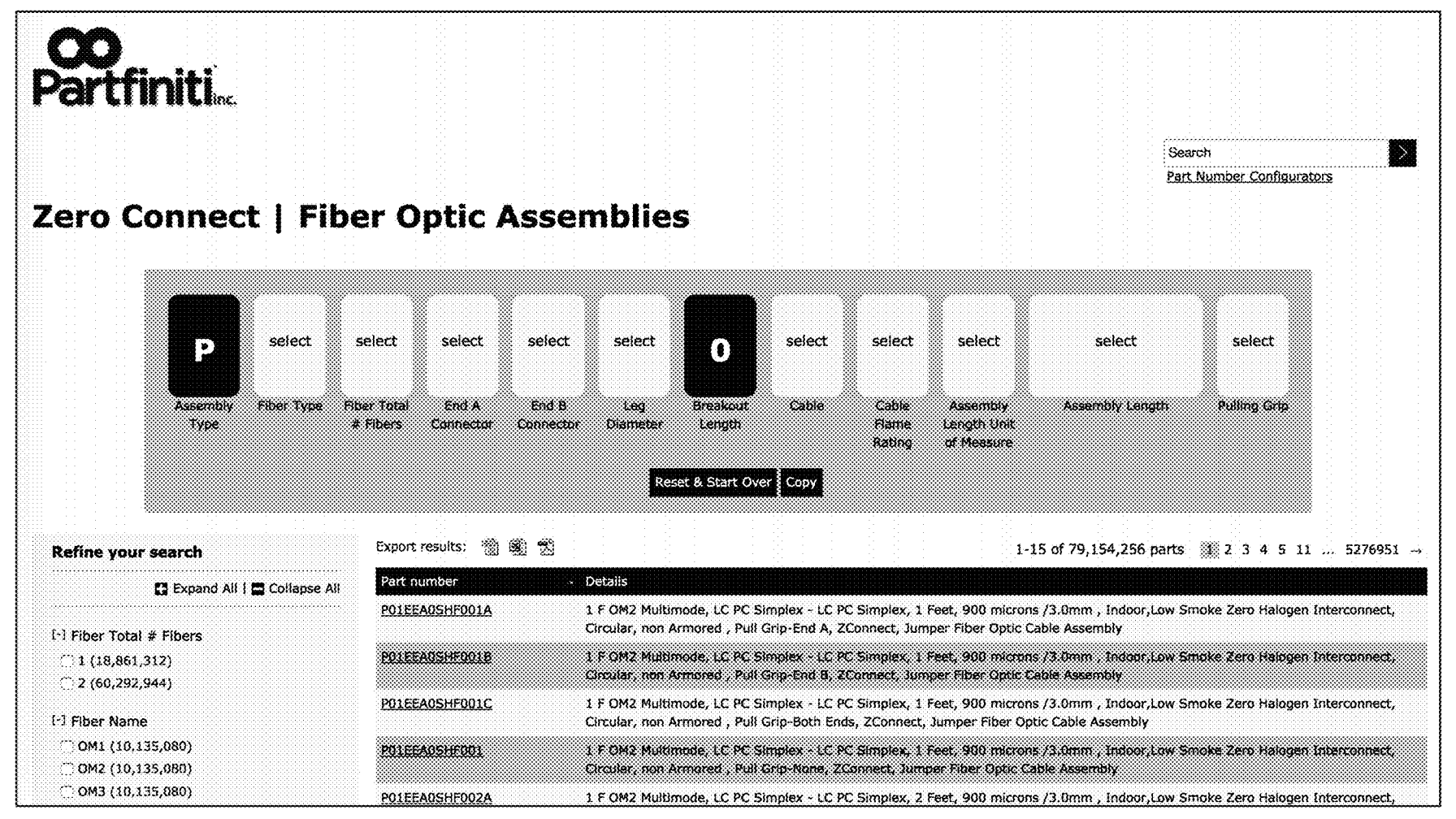

FIG. 2 illustrates an exemplary system 200 for building a data store and providing part numbers for configurable products based on data stored in the data store according to an embodiment of the present disclosure. The data store 210 may store data for generating part numbers and/or specification information of configurable products. A faceting engine 220 and a search engine 230 may use the data stored in the data store 210 to generate the part numbers and/or retrieve specification information of configurable products. The generated part number and/or the specification information of the configured products may be presented to a user via the presentation layer 240. FIGS. 12A-12R illustrate a user interface that may be presented via the presentation layer 240.

The data in the data store 210 may include configurable product meta data and/or static product data. The configurable product meta data may include generation rules for generating part numbers of configurable products. The configurable product meta data may be generated based on configurable product specification data received from a user (e.g., supplier of the product). The static product data may correspond to a specifically configured product and may include full data of the configured product. For example, the static product may be a product that is manually modified after being generated based on the configurable product meta data.

The faceting engine 220 may perform faceted search of the meta data stored in the data store 210. The meta data stored in the data store 210 may be organized according to a faceted classification system allowing the assignment of an object to multiple taxonomies (sets of attributes), and enabling the classification to be ordered in multiple ways, rather than in a single, predetermined, taxonomic order. The faceted classification may provide for an analytic-synthetic classification scheme with objects assigned to multiple taxonomies. The faceted search may provide search results that are filtered based upon aspects or facets that are particular to the query being searched. For instance, if a query is received by the search engine 230 containing the term "12 fibers," facets that are specific to the query may include "12" or "fiber" or "multi fiber." The meta data being organized according to the faceted classification system allows for fast and flexible way to provide real-time search results and with ad hoc querying abilities through the use of keywords. The faceting engine 220 may return results for a search query and facet counts providing a breakdown or summary of the results based on some simple criteria, which can be used to help implement more advanced searches.

The configurable product meta data may be generated by a PNB processing engine 250 based on information about the configurable product provided by a part number builder 260 and/or a specification database 270. The information about the configurable product may include the specifications of the configurable product, which includes constraints and/or particulars.

The static product data may be input via an application for generation static parts 290 and stored in the data store 210. The application for generation static parts 290 may provide a user interface to receive a part number and specification information of a specifically configured product. In another embodiment, the application for generation static parts 290 may receive user inputs to configure a part based on the configurable product meta data, receive user defined modification to the configured product specifications and/or part number, and store the information for the modified configured product with an associated part number in the data store 210. The information for the modified configured product that is stored in the data store 210 may include the full specification of the part. Because the full specification of the modified configured product is stored in the data store 210 the system requirements may linearly increase with respect to the number of modified configured products.

The part number builder 260 and the PNB processing engine 250 may receive the configurable product specification information and process the specification information to generate meta data that can be used by search engine. The part number builder 260 and the PNB processing engine 250 may generate meta data organized according to the faceted classification system allows for faceted searched to be performed The specification database 270 may store information about the configurable products. The specification database 270 may store information received from suppliers of the products, and may include, for example, configurable features of a product, specifications of the features, constraints, particulars, part number format, images of the product and/or product features, technical information, cost, and/or product availability. The information stored in the specification database 270 may be used by the part number builder 260 and/or the PNB processing engine 250 to generate the configurable product meta data which is stored in the data store 210. The information stored in the specification database 270 may be retrieved and displayed to a user via the presentation layer 240 after a user configures and selects a configured product.

The user interface 262 may be used to receive information about the configurable product from a user (e.g., supplier of the configurable product). The information stored in the specification database 270 may be input via the user interface 262.

Figure 3:
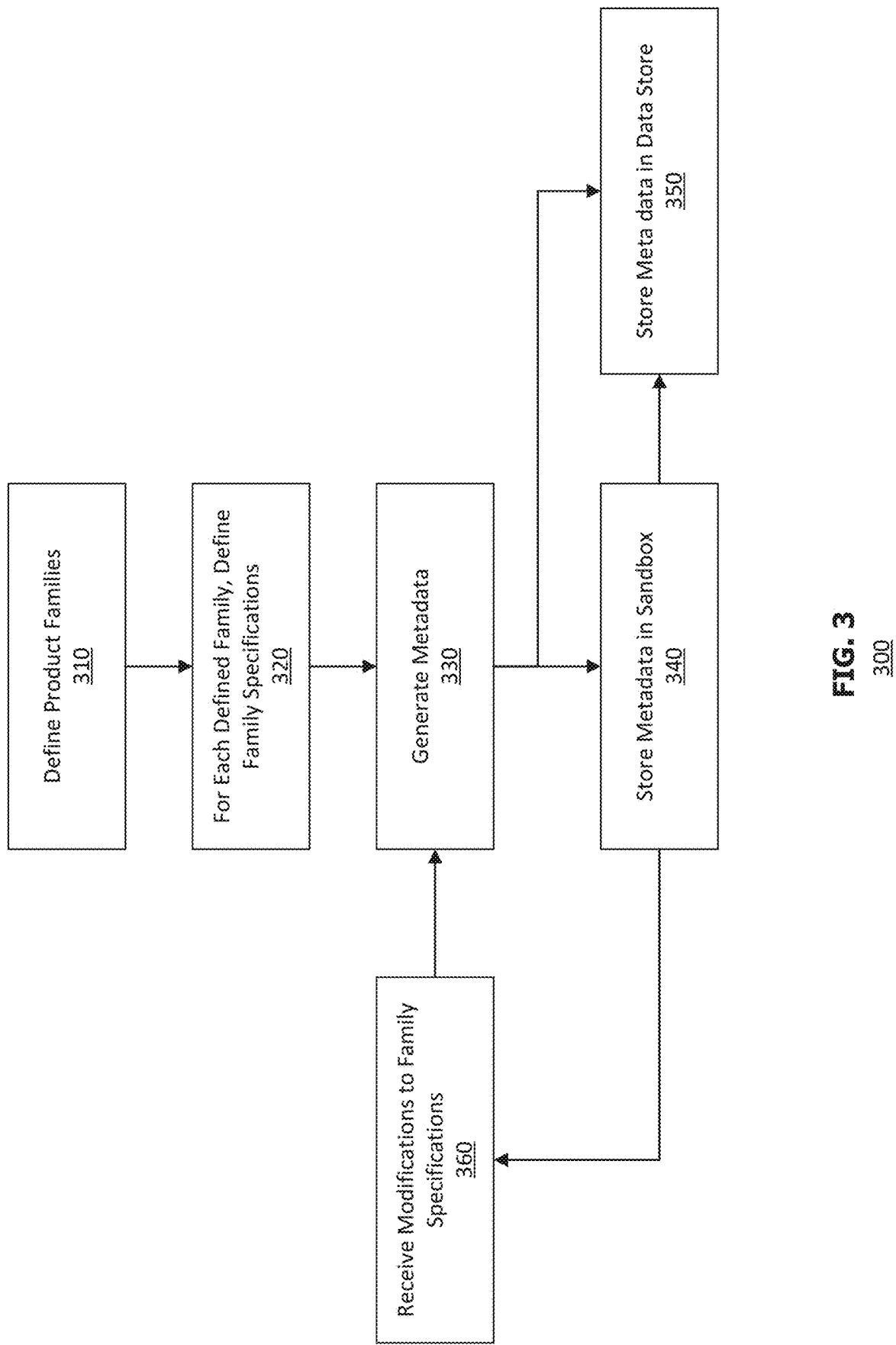
FIG. 3 illustrates a method 300 for generating rules for part number generation according to an embodiment of the present disclosure.

FIG. 3 illustrates a method 300 for generating rules for part number generation according to an embodiment of the present disclosure. The method 300 for generating the part number generation rules may be performed, for example, by one or more components shown in FIG. 2.

The method 300 may include defining product families 310 to provide a list of families for one or more configurable products. The product families may be defined based on user specified families via a user interface. A family may correspond to a single configurable product having a plurality of configurable features.

Next, for each defined family, family specifications may be defined 320. The family specification for each defined family may include basic information about the family, part number format, constraints, locations (e.g., URLs) of images and datasheets that can be downloaded and attached to each product, particulars, related parts, and/or short values.

The part number format may define the characters, number, and/or symbols that correspond to specific features of the product and/or the specific arrangement of the characters, number, and/or symbols. For example, the part number format may require that the at a first position of the part number a single character defines an assembly type of a cable, at a second position of the part number a single number defines a type of fiber in the cable, and at a third position of the part number a number defines the number of total fibers in a cable.

The basic information may include the manufacturer, product category, description, title, subtitle, data source, trademarks, and/or display options. The related parts may provide criteria defining which parts are deemed related to other parts. The related parts may, for example, mark as related all parts that have identical numbers except symbols at a predefined position (e.g., a third position of the part number), and/or mark as related all parts that have all identical attributes except for value of one attribute (e.g., fiber count). When the user views a part, the related parts of the viewed part may also be displayed to the user.

Each part may have two descriptions automatically generated. A first description may be a long description and the second description may be a short description. The second description may be derived from the first description. The long description may use full attribute values of the part (e.g., 12 Fiber Cable). The short description may use short values (e.g., 12 F Cbl). A mapping (e.g., via a mapping table) may be sued to provide a correspondence between the short description and the long description. For example, the mapping may provide that "Fiber" corresponds to "F" and that "Cable" corresponds to "Cbl." Thus, the system may generate a long description from a short description, or vice versa, by consulting the mapping.

When the product families and the specification of the product families are defined, a request may be made to process the defined family specifications to generate the metadata 330. The request to process the defined family specifications may be made when new information is provided to the family specifications or when modifications are made to the family specifications. The metadata may be created such that the search engine can perform faceted searches and generate the part numbers on the fly.

The generated meta data may be stored in the sandbox 340 and/or the data store 350. The meta data stored in the sandbox 340 may provide an isolated version of the meta data. The isolated version of the meta data in the sandbox 340 may allow for the user to review the parts generated based on the meta data and make modifications to the family specifications 360. Based on the modifications to the family specifications, the generation of the meta data 330 may be repeated to update the meta data.

The meta data stored in the data store 350 may provide meta data for an application and/or website generating the part numbers on the fly in response to user requests. In one embodiment, the meta data from the sandbox may be merged into the meta data that is already stored in the data store.

Figure 4:
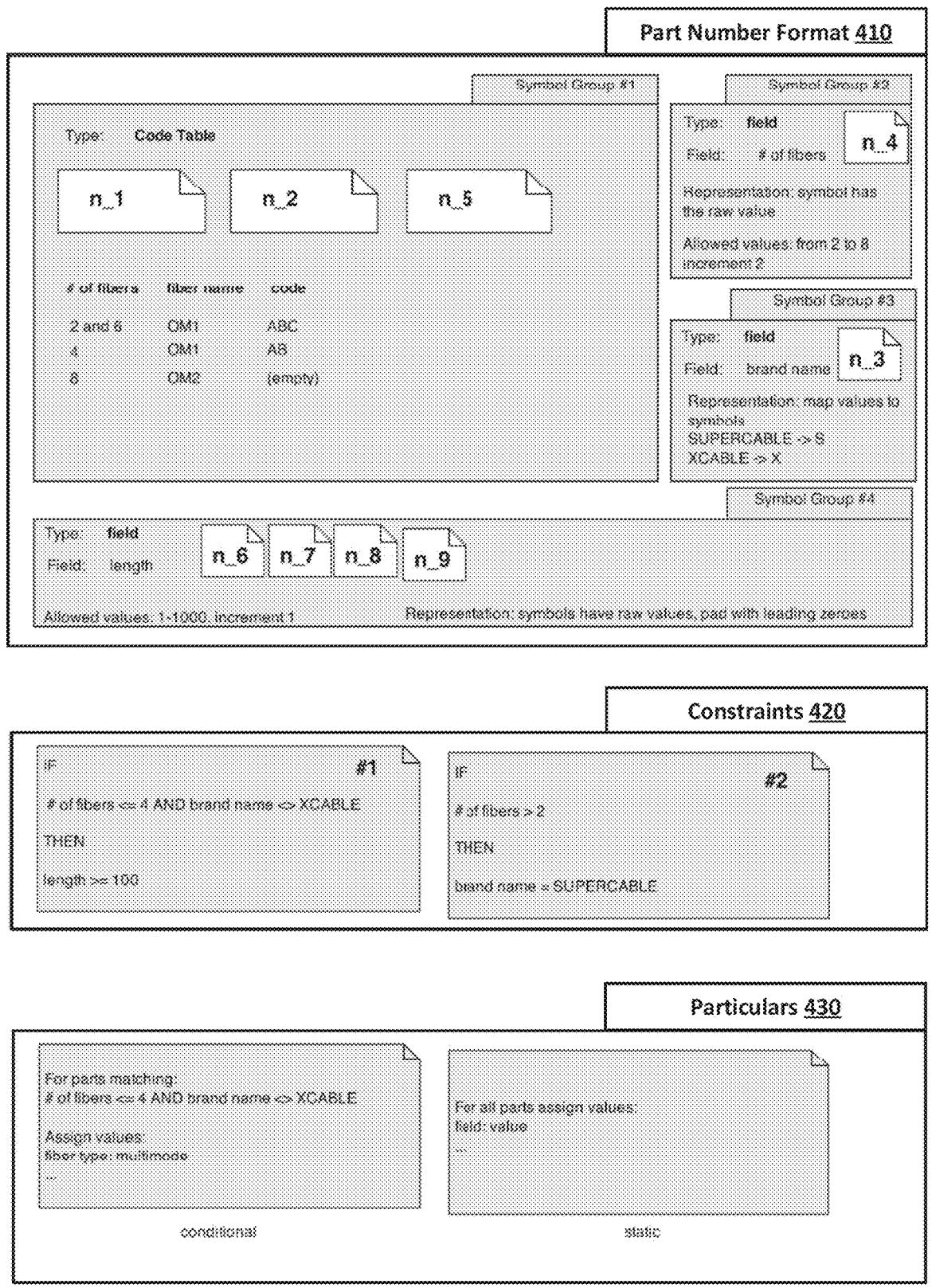
FIG. 4 illustrates family specifications for a product according to an embodiment of the present disclosure.

FIG. 4 illustrates family specifications for a product according to an embodiment of the present disclosure. The family specifications may define the part number format 410, constraints 420, and particulars 430. FIG. 4 illustrates family specifications for a cable but, as one of ordinary skill in the art would understand, the part number format 410, constraints 420, and particulars 430 may be provided for other products.

As shown in FIG. 4, the part number format 410 defines a plurality of symbol groups (e.g., symbol group #1, symbol group #2, and symbol group #3). Each symbol group may include one or more symbols. For example, symbol group #1 includes three symbols at part number positions n_1, n_2, and n_5. Symbol group #2 includes one symbol at part number position n_4. Symbol group #3 includes one symbol at part number position n_3. Symbol group #4 includes four symbols at part number positions n_6, n_7, n_8, n_9.

Each symbol group may be a code table type or a field type. A code table type symbol group (e.g., symbol group #1) may define a code (e.g., combination of character, numbers and/or symbols) corresponding to specific product features. Each code may define a plurality of product features of the product. For example, symbol group #1 may include code AB that defines cable with fiber name OM1 having 4 fibers.

A field type symbol group (e.g., symbol group #2, or symbol group #3) may provide a value (e.g., character(s) and/or numeral(s)) for a field corresponding to one or more features of the product. In one embodiment, a field type symbol group may include a single field corresponding to only one feature of the configurable product. For example, symbol group #2 is a field type symbol group with the field defining a number of fibers. One or more of the symbol groups may include restrictions for values that can be provided in the symbol group. For example, for symbol group #2, the fourth symbol of the part number may restricted to number values between 2 and 8 with increments of 2.

The constraints 420 may define limitations on certain features of a product when one or more conditions are satisfied. The conditions may include selection of specific values for a feature and/or selection of a feature. Each constraint may include a plurality of conditions (e.g., greater than, less than, equal to) and may include AND conditions, OR conditions or a combination of AND and OR conditions. For example, a first condition may require that when the number of fibers <=4 AND brand name < > XCABLE THEN length of cable >=100. A second condition may require that when the number of fibers >2 THEN brand name=SUPERCABLE. In one embodiment, the family specifications may include no constraints.

The particulars 430 may define requirements that must be satisfied when one or more conditions are present. The particulars 430 may include conditional particulars that are applied when one or more defined conditions are satisfied and/or static particulars that are applied without having to meet any specified conditions. For example, a conditional particular may require that for all parts with number of fibers <=4 AND brand name < > XCABLE assign value "multi-modal" to fiber type.

Figure 5:
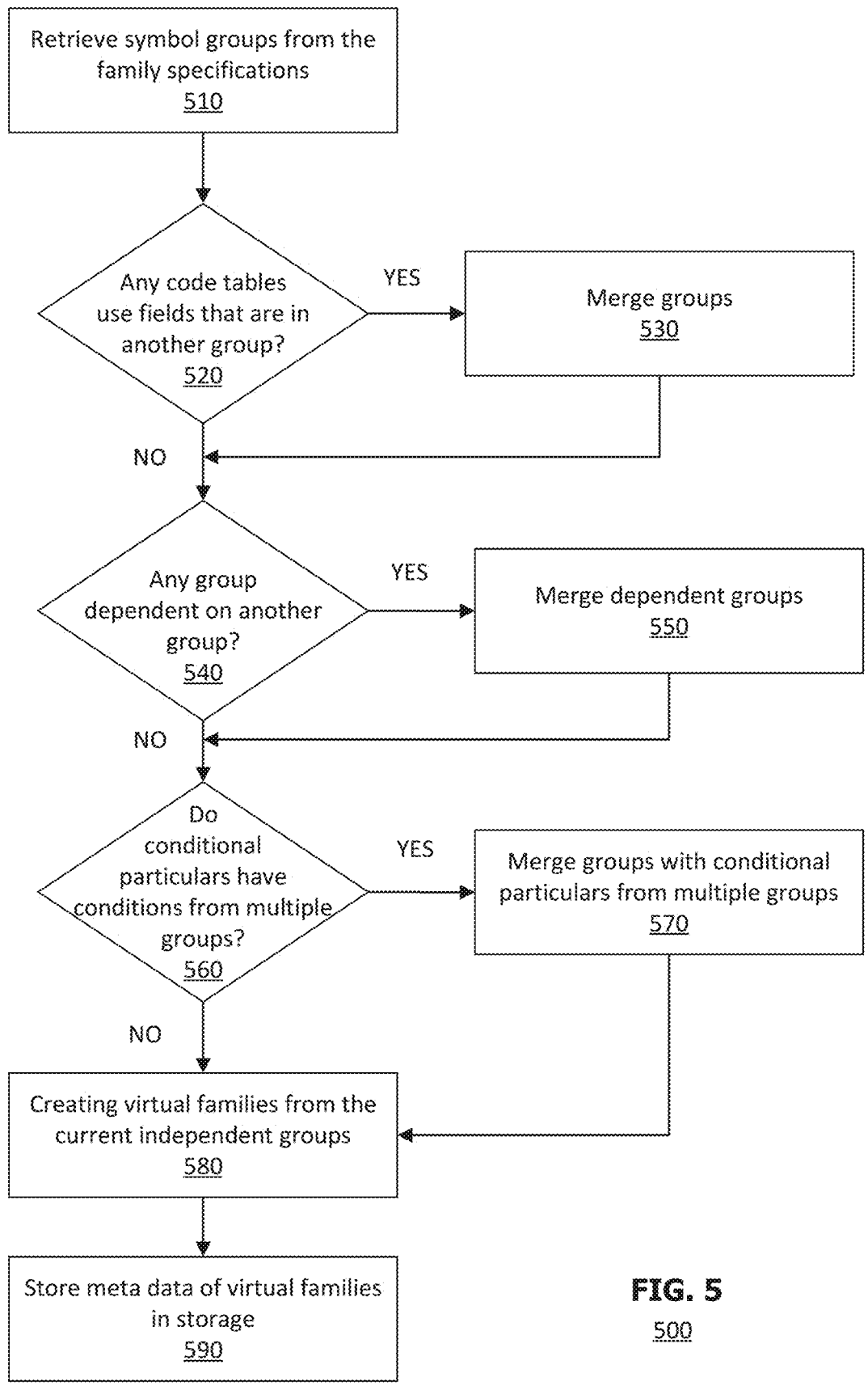
FIG. 5 illustrates a method for generating meta data from family specifications according to an embodiment of the present disclosure.

FIG. 5 illustrates a method 500 for generating meta data from family specifications according to an embodiment of the present disclosure. The method 500 for generating the meta data can be performed, for example, by one or more components shown in FIG. 2. In one embodiment, the method 500 may be performed by the PNB processing engine 250. The method 500 may be performed to generate the meta data each time product specification information is added or modified for configurable products.

The method 500 may receive family specifications including, for example, part number format, constraints, and/or particulars and generate meta data including virtual families of independent groups. Thus, a single family may be divided into independent groups of one or more symbols, with an exclusive set of particulars assigned to each group. An independent group may include one or more part number symbol positions with character(s) at each position(s) that do not depend on character(s) at position(s) outside of the independent group.

As shown in FIG. 5, the method 500 may include retrieving symbol groups from the family specifications 510. Each of the retrieved symbol groups may initially be treated as an independent group (e.g., a first type of independent group that does not have any modifications). For example, each of the symbol four groups shown in part number format 410 of FIG. 4 may be treated as an independent group providing the four independent groups listed in Table 1.

TABLE 1

| Independent group 1: n_1, n_2, n_5 |
|---|
| Independent group 2: n_4 |
| Independent group 3: n_3 |
| Independent group 4: n_6, n_7, n_8, n_9 |

Next, a determination may be made as to whether any code tables from one group uses fields in another group 520. If a code table from one group uses fields in another group (YES in step 520), then the corresponding groups may be merged 530. For example, code table in symbol group 1 (i.e., independent group 1) uses "a number of fibers" and "a number of fibers" is also used in symbol group 2 (i.e., independent group 2). Accordingly, independent group 1 and independent group 2 may be merged to provide a new independent group 5 that includes symbol positions from both groups.

Table 2 lists the current independent groups after the merger of independent group 1 and independent group 2.

TABLE 2

| Independent group 5: n_1, n_2, n_4 n_5 |
|---|
| Independent group 3: n_3 |
| Independent group 4: n_6, n_7, n_8, n_9 |

In one embodiment, when two code tables are merged, the rows may be combined only where all fields that the groups have in common (of which there can be more than one) have the same values. Such merging may provide for implicit constraints. For example, consider a symbol group #5 including a table with two rows (first row with Fiber name OM1; # of fibers: 4; and second row with Fiber name OM1; # of fibers: 8) is merged with symbol group #1 shown in FIG. 4. With the merger only the first row of symbol group #5 has a corresponding row (e.g., common fields with same values) in symbol group #1 (i.e., second row). Accordingly, with the merger all other tows would be discarded when symbol group #1 is merged with symbol group #5.

Next, a determination may be made as to whether the current independent groups are dependent on each other 540. The determination of which groups are dependent on other groups may be made based on the constraints in the family specifications. If based on the constraints one group depends on another group (YES in step 540), the dependent groups may be merged to form a new independent group. The merging of groups may be prevented if the merged group would generate a large number of possible values (over a predetermined number of values). The predetermined number of values may be determined based on a function of available working memory (RAM), CPU speed, and/or the nature of the family (e.g., whether there are many virtual families created for different lengths). For example, on a single server with 16 GB RAM, an upper limit for a single family may be a few million (e.g., <=5) possible values split between 30-50 virtual families (avg. 167,000 per family).

There may be a tradeoff between the number of values and the number of virtual families because when the groups are not merged, the number of virtual families may be doubled (when there are empty families, which can be discarded, this number may be lower and not be doubled). Handling virtual families thus may be considered costly in some cases. For example, one virtual family with 5,000,000 values may be preferable over the same number of values split between two families or over 4,000,000 values split between two families. It may be preferable, if possible, to split 10,000 values between 32 families. However, such considerations may not always come into play (e.g., when there is a relatively small database or number of combinations, significant processing power is provided, etc.).

The family specifications shown in FIG. 4 include two constraints. The first constraint requires that when "the number of fibers" and "the brand name" meet predetermined conditions, the length of the cable needs to be less than 100. Accordingly, the first constraint makes the independent group with "the number of fibers" (i.e., independent group 5), the independent group with "the brand name" (i.e., independent group 3), and independent group with "the length of cable" (i.e., independent group 4) be dependent on each other. However, because the length of "the length of cable" can be one of 1,000 possible values, merging these groups to take account of the first constraint would produce a very large group (e.g., a number of combinations that is above a predetermined value). Accordingly, the first constraint is not taken into consideration at this time by merging the groups, but can be considered by other means later.

The second constraint requires that when "the number of fibers" meets a predetermined condition, the brand name of the cable needs to be a particular brand. Accordingly, the second constraint makes the independent group with "the number of fibers" (i.e., independent group 5) and the independent group with "the brand name" (i.e., independent group 3) be dependent on each other and cab be merged to provide a new independent group 6. Independent group 5 can be merged with independent group 3 because the merger will not provide a very large group (i.e., the merged group will have possible combinations that is below a predetermined value). Table 3 lists the current independent groups after the merger of independent group 5 and independent group 3.

TABLE 3

Independent group 6: n_1, n_2, n_3, n_4 n_5
Independent group 4: n_6, n_7, n_8, n_9

With consideration of the second constraint, the number of possible values in independent group 6 will be reduced to provide.

TABLE 4

| Number of Fibers | Fiber Name | Brand Name | n_1 | n_2 | n_3 | n_4 | n_5 |
|---|---|---|---|---|---|---|---|
| 2 | OM1 | SUPERCABLE | A | B | S | 2 | C |
| 2 | OM1 | XCABLE | A | B | X | 2 | C |
| 4 | OM1 | SUPERCABLE | A | B | S | 4 | |
| 6 | OM1 | SUPERCABLE | A | B | S | 6 | C |
| 8 | OM2 | SUPERCABLE | | | S | 8 | |

Next, a determination may be made as to whether the conditional particulars have conditions from multiple groups 560. If the conditional particulars have conditions from multiple groups (YES in step 560), then the groups may be merged 570. For the family specification show in FIG. 4, the conditional particulars (i.e., the number of fibers and the brand name) are from the same independent group and thus merging of groups is not necessary.

The new independent group created by merging independent groups and taking account of constraints, and/or particulars may be a second type of independent groups.

With the constraints and the particulars taken into account, virtual families from the current independent groups may be created 580 and stored as metadata in the storage 590. The meta data for all of the independent groups may be stored in a single table. The meta data may also include dedicated tables for manually defined products (e.g., a single table including all the information for each manually defined product). The metadata may be stored in a database configured to implement hierarchical faceting. Such a database may support pivot facets. For example, the metadata may be stored in Apache Lucene™ Solr platform. The creating of the virtual families including the independent groups that correspond to the properties of the configurable product allow for facet searches to be performed and to perform pivot faceting to facet within the results of the parent facet.

Figure 6:
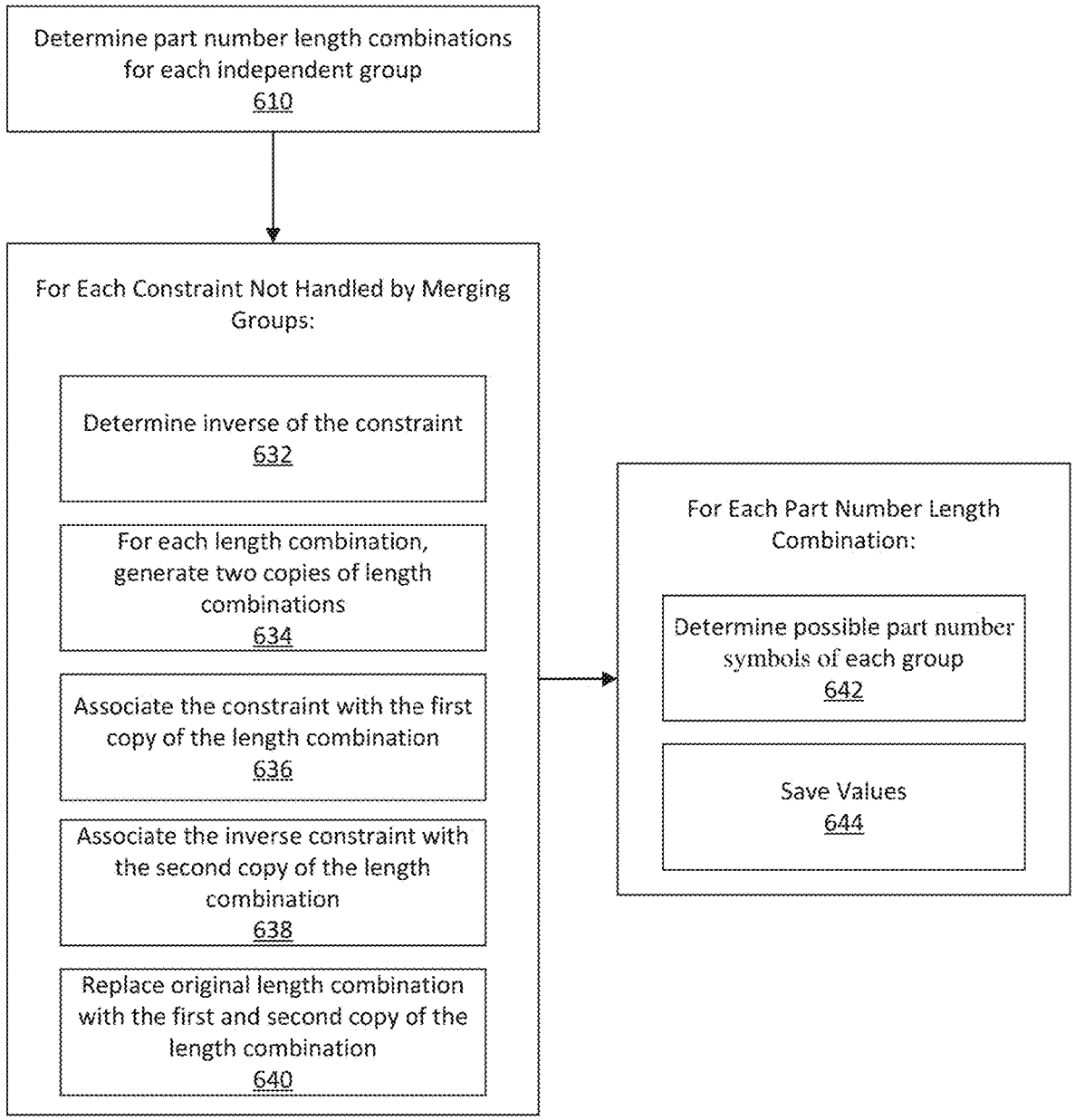
FIG. 6 illustrates a method for creating and storing virtual families from the current independent groups according to an embodiment of the present disclosure.

FIG. 6 illustrates a method 600 for creating and storing virtual families from the independent groups according to an embodiment of the present disclosure. The method 600 for creating and storing virtual families from the current independent groups can be performed, for example, by one or more components shown in FIG. 2. In one embodiment, the method 600 may be performed by the PNB processing engine 250.

The independent groups generated from the family specifications (e.g., by method 500) may provide part number symbols of varying length. For example, as shown in Table 4, the part number symbols generated from independent group 6 may result in different lengths (e.g., ABS2C, ABX2C, ABS4, ABS6C and S8). To enable wildcard searches (e.g., ABC*DEF or *DEF) by the search engine (e.g., search engine 230 shown in FIG. 2), the method 600 may generate virtual families such that all of the part number symbols provided by a virtual family is of the same length. Accordingly, one virtual family may provide part number symbols of one length and another virtual family may provide part number symbols of another length.

The method 600 may begin by determining part number length combinations for each independent group 610. As an example, independent group 4 always has a part length of 4 and independent group 6 has possible part lengths of 5, 4, and 2 (see Table 4 showing the three possible part lengths). Accordingly, the possible part number length combinations for the combination of independent groups 4 and 6 will be lengths of 9, 8, or 6.

Next, the method 600 may take account of each constraint not handled by merging groups based on the constraint (e.g., constraints that would have produced groups with a number of possible combinations over the predetermined number). As shown in FIG. 6, for each constraint not handled by merging groups, the method 600 may determine inverse constraint 632, for each length combination, generate two copies of length combinations 634, associate the constraint with the first copy of length combination 636, associate the inverse constraint with the second copy of length combination 638, and replace original length combination with the first and second copy of length combinations 640 including the constraint and the inverse constraint, respectively.

With all of the constraints taken into account, for each part number length combination, possible part number symbols of each independent group may be determined 642 and stored in storage 644. The possible part number symbol combinations for each independent group may be determined while taking into account the constraints attached to the part number length combinations. The maximum number of length combinations may be the original number of length combination times two raised to the number of constraints. Because empty combinations are discarded the actual number of length combination will generally be less than the maximum number of length combinations. The empty combination may be a combination in which at least one independent group is empty (e.g., the independent group has no values allowed by the constraints).

As discussed above with reference to the family specifications shown in FIG. 4, the independent groups associated with the first constraint were not merged because such a merger would produce a very large group. This constraint can now be considered by determining an inverse constraint of the first constraint. With the first constraint being "if the # of fiber <=4 AND brand name < > XCABLE THEN length >=100" the inverse constraint of the first constraint would be "if the # of fiber >4 OR brand name=XCABLE THEN length can have any value." The first constraint can be applied to a first copy of each length combinations and the inverse of the first constraint can be applied to a second copy of each length combinations.

The resulting independent groups with the first constraint and the inverse of the first constraint are shown in FIG. 7. As shown in FIG. 7, four virtual families are generated with one of the first constraint and the inverse of the first constraint being applied to the family Each virtual family includes the sixth independent group and fourth independent group. The virtual families may be saved in storage as meta data.

Figure 8:
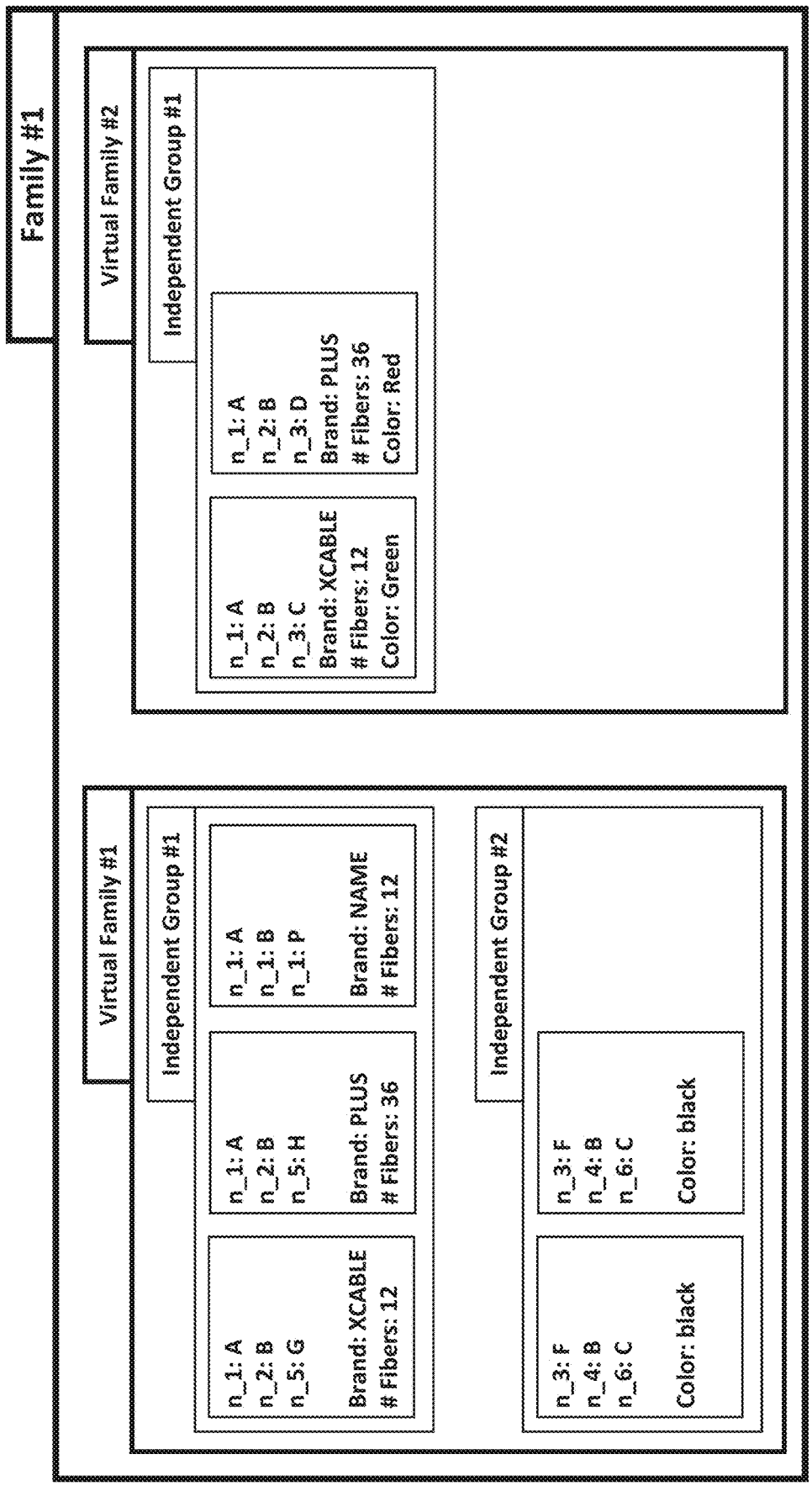
FIG. 8 illustrates a hierarchical view of the meta data for a first family according to another embodiment of the present disclosure.

FIG. 8 illustrates a hierarchical view of the meta data for a first family according to another embodiment of the present disclosure. The first virtual family may include a first independent group and a second independent group. The search engine (e.g., search engine 230 shown in FIG. 2) may produce six parts from the first virtual family. A first part number being ABFBGC for a black XCABLE with 12 fibers, a second part number being ABABGG for a yellow XCABLE with 12 fibers, a third part number being ABFBHC for a black PLUS with 36 fibers, a fourth part number being ABABHG for a yellow PLUS with 36 fibers, a fifth part number being ABFBPC for a black NAME with 12 fibers, and a sixth part number being ABABPG for a yellow NAME with 12 fibers. The search engine may produce two parts from the second virtual family A first part number being ABC for a green XCABLE with 12 fibers and a second part number being ABD for a red ABCDE with 36 fibers. The virtual families may be invisible to a user performing a search. In response to a search, eight part numbers (six from the first virtual family and two from the second virtual family) could be provided from the first family.

FIG. 9 illustrates a flat view of the meta data for a first family according to an embodiment of the present disclosure. The meta data shown in FIG. 9 corresponds to the meta data shown with a hierarchical view in FIG. 8. While FIGS. 8 and 9 illustrate meta data for a single family, data for a plurality of heterogeneous families may be stored in a similar manner With such structure, a single query can return results from different families. In contrast to storing data of the plurality of heterogeneous families in a single table in the manner suggested above, traditionally, different families have been stored in separate database tables. Such structures required multiple queries and/or for products from a family to have a same number field formats. In contrast, the embodiment of the present disclosure allow for multiple virtual families and/or families to be stored in a single table and all searched by a single query.

Figure 10:
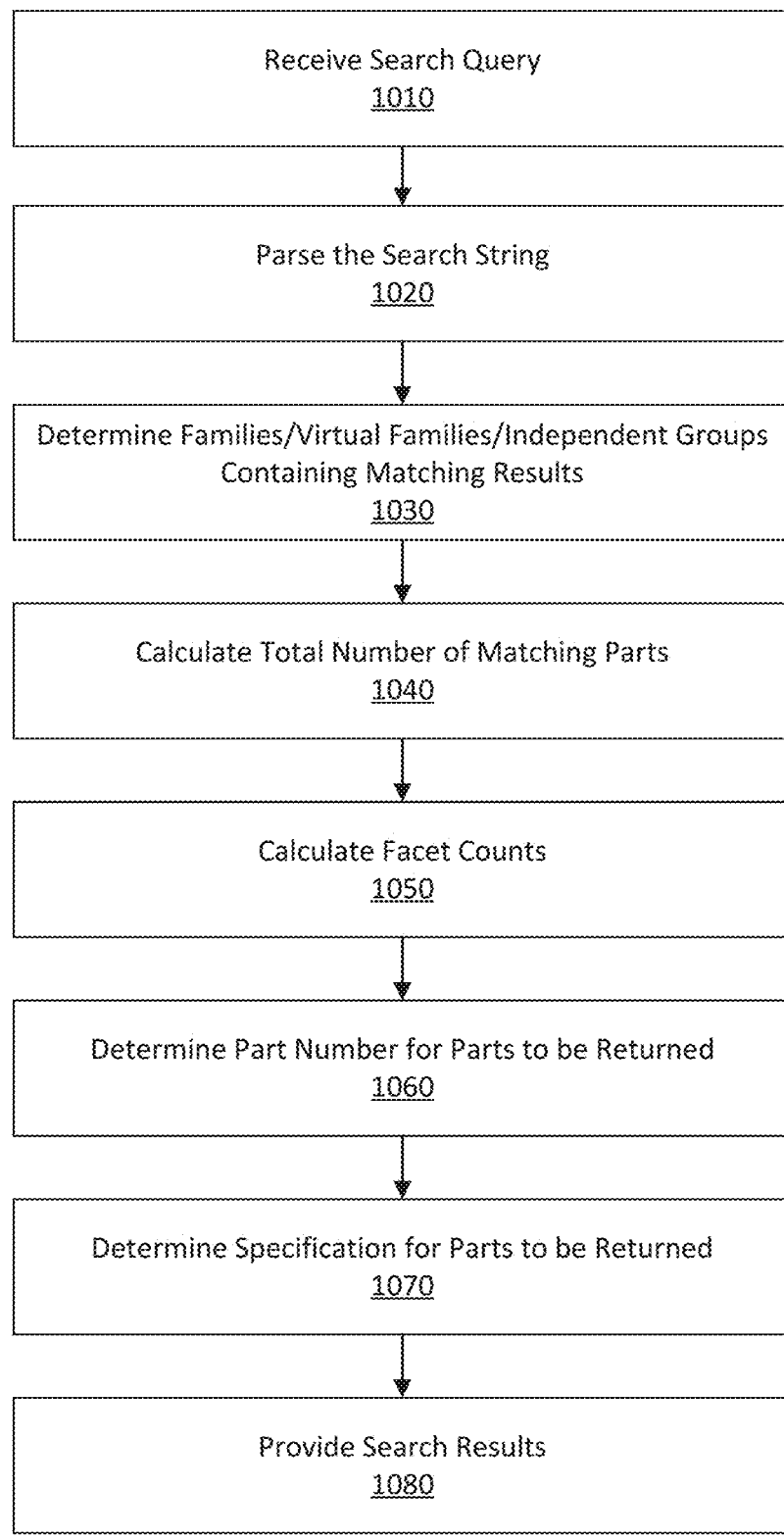
FIG. 10 illustrates a method for performing a search query according to an embodiment of the present disclosure.

FIG. 10 illustrates a method 1000 for performing a search query according to an embodiment of the present disclosure. The method 1000 may be performed by a search engine (e.g., search engine 230 shown in FIG. 2). The method 1000 may begin by receiving a search query 1010. The search query 1010 may include a search string, search criteria, sorting options, and/or pagination selection. The search string may specify the features of a product a user desires. For example, the search string entered by a user may include "12 fiber ABCD*." The search string may include symbols for wild searches and is not limited to any combination of searchable properties. The search treats all configurable properties as being searchable.

The search criteria may include selections from predefined search criteria for a product. The predefined search criteria may be preselected based on the kind of product(s) for which the search is performed and/or terms in the search string. For example, the criteria may include providing parts with number of fibers between 12 and 36, and the brand name to be equal to "SUPERCABLE." The sorting options may define how the results are displayed to the user. For example, the sorting options may provide the field by which to sort the product (e.g., by manufacturer) and/or the direction (e.g., ascending or descending order).

The received search query may be parsed 1020 and a determination may be made as to which families, virtual families, and/or independent groups contain matching results 1030. The parsing of the search query may include comparing each word, character combination and/or symbol combination present in the query against a database of entities that correspond to all entries present in the metadata.

For example, the search query for "12 fiber ABCD*." May be parsed to provide entries show in Table 5.

TABLE 3

| # of fibers | 12 |
|---|---|
| # of fibers unit of measure | Fiber |
| n_1 | A |
| n_2 | B |
| n_3 | C |
| n_4 | D |

Determining which virtual families contain the matching results of the parsing, may include (1) retrieving pivot facets for family_id→virtual_family_id→independent_group_id and (2) for each virtual family, determine if there are matching records for every independent group that belong to the respective virtual family Virtual families that have independent groups with no results may be discarded from the results.

Next, a calculation may be made to determine the total number of matching parts 1040. The following routine may be executed to determine the total number of matching parts.

```
total_count = 0
for each virtual-family
    family_count = 1
    for each independent-group
        group_count = independent-group.getNumFound( )
        family_count = family_count * group_count
    total_count=total_count + family_count
return total_count
```

Next, a calculation may be made to determine the facet counts 1050. The facet counts may provide a breakdown or summary of the results based on some simple criteria, which can be used to help implement more advanced searches. The facet count may not affect the results section of the matching products and part numbers. The calculated facet counts may provide list of possible values for each attribute and, for each value, the number of parts that will be returned if the value is added as a criterion to the search query. For example, after returning the search results for search query "12 fiber ABCD*," the facet counts may be calculated for black, yellow, green, and red cables.

Determination part numbers for parts to be returned 1060 provides a list with part numbers that match the search query. Determining the part number may include performing a plurality of iterations to calculate a number of matching parts in each family, virtual family, and independent groups, and provide allowed symbols at each position that match the search query.

FIG. 11 illustrates iterative steps that may be made to determine the part number of parts to be returned. The search query may specify an offset of 2,000 and a limit of 3. The offset and limit may specify the pagination for the results. The offset and limit may be set in response to user input specifying a page number and/or page size indicating a number of results on each page. The system may translate the user input into the value for the offset and the value for the limit. The initial results may provide 1,000 part from the first family, 7,500 parts from the third family, and 5,000 parts from the eleventh family.

In the first iteration, the possible symbols allowed at a first part number position may be determined. FIG. 11 illustrates the three possible symbols (P, Q, or R) that are allowed at the first part number and shows the number of matching parts of each symbol for each virtual family Because the offset is 2,000 and there are 1,000 parts that start with P in the first family, the parts starting with P can be discarded and the offset can be reduced to be 1,000. There are 10,000 parts that start with Q and because the limit is set to 3, all of the wanted parts will start with Q.

In the second iteration, the possible symbols allowed at a second part number position may be determined. FIG. 11 illustrates the two possible symbol groups of QA and QB that are allowed and shows the number of matching parts of each symbol group for each remaining family Because the offset is 1,000 and the limit is set to 3, all of the wanted parts will start with QA.

In the third iteration, the possible symbols allowed at a third part number position may be determined. FIG. 11 illustrates the two possible symbol groups of QA0, QA1, QA2, QA3, and QAD are allowed and shows the number of matching parts of each symbol group for the third family and fourth independent group. The parts for QA0 can be skipped because the offset is 1,000, and the offset can be updated to be 0. Because there are no symbol combinations after QA1, the limit can be reduced by one to set limit to 2 and QA1 can be returned as one of the results. Because there are no symbol combinations after QA2, the limit can be reduced by one to set limit to 1 and QA2 can be returned as one of the results.

In the fourth iteration, the possible symbols allowed at a fourth part number position may be determined. FIG. 11 illustrates the one possible symbol QA3H is allowed and shows one match for the third family and fourth independent group. Because there are no symbol combinations after QA3H, the limit can be reduced by one to set limit to zero and QA3H can be returned as one of the results. Accordingly after four iterations, the returned part number may be QA1, QA2 and QA3H.

A determination of specification for the returned parts 1070 may include retrieving fields stored in the independent groups containing the matching results, retrieving information stored in a relational database for the retrieved fields, and compile short and long descriptions of the parts to be returned. The content for the short and long descriptions may be predefined by the supplier of the product. The information retrieved from the relational database may include part-specific information and information for the family.

Providing the search results 1080 may include displaying the total count of parts matching the search query, the determined part numbers, and the specification of the parts matching the search query. The search results may be displayed to a user based on the defined constraints, sorting options and/or pagination selections. The search results may also provide a list of possible values of each attribute and for each value, the number of parts that will be found if the value is added as a criterion to the search query FIGS. 12A-12R illustrate the process of making selections of a configurable product according to an embodiment of the present disclosure. While the configuration process in FIGS. 12A-12R is illustrated with reference to a configurable fiber optic cable, the process may be applied to other configurable products.

FIGS. 12A-12R illustrate a user interface for allowing a user to select desired configurations of a fiber optic assembly. The user interface allows a user to select configurable features of the product (e.g., assembly type, fiber type, fiber total #fibers, end A connector, end B connector, leg diameter, breakout length, cable, cable flame rating, assembly length unit of measure, assembly length, and pulling grip). Products that match the current configuration selections are listed by part number and with a short detailed description. The user may select a particular part number to obtain further specification information for the product and ordering information. The ordering information may include availability of the product, price of the product, where product can be ordered, and/or a request for a price quote.

Figure 12C:
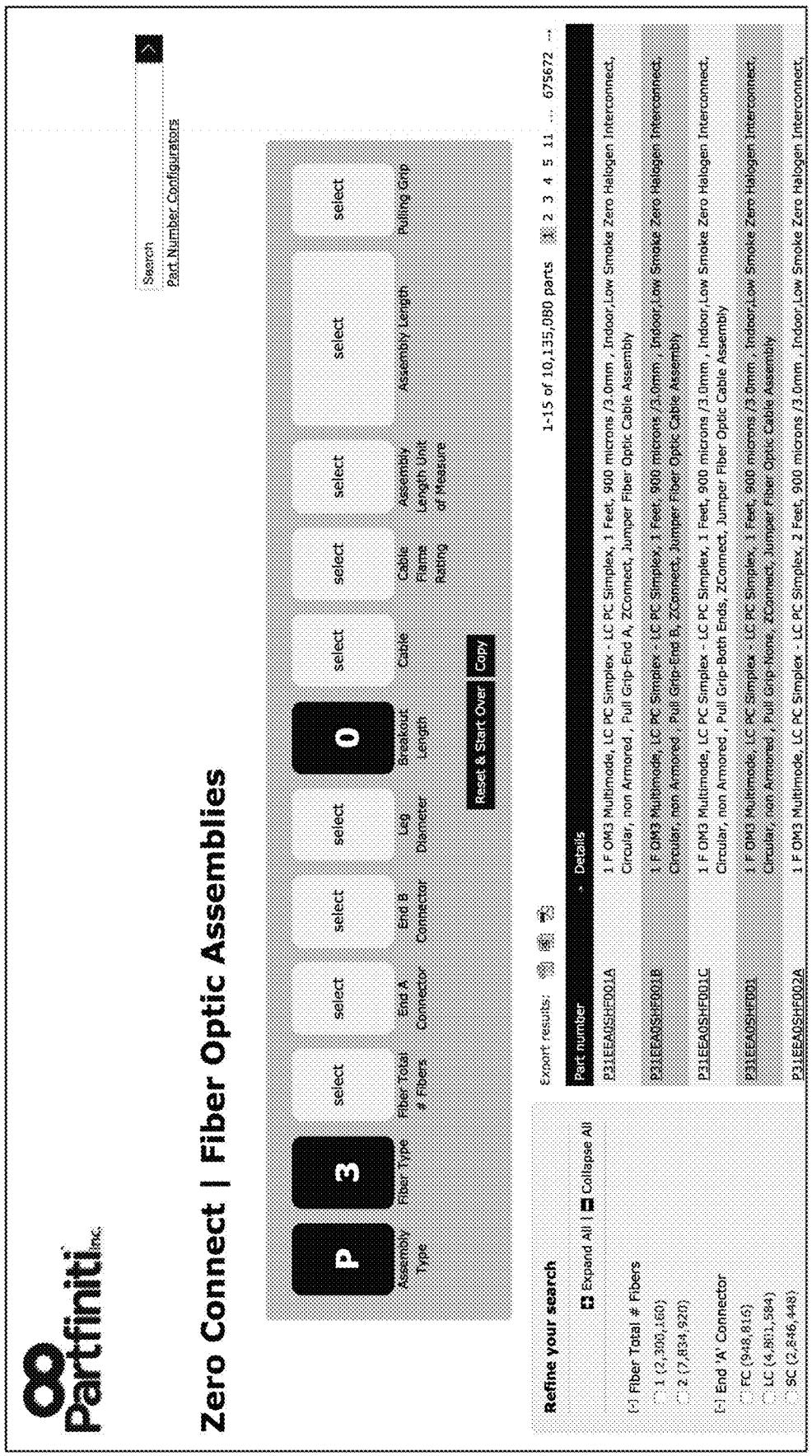
Figure 12D:
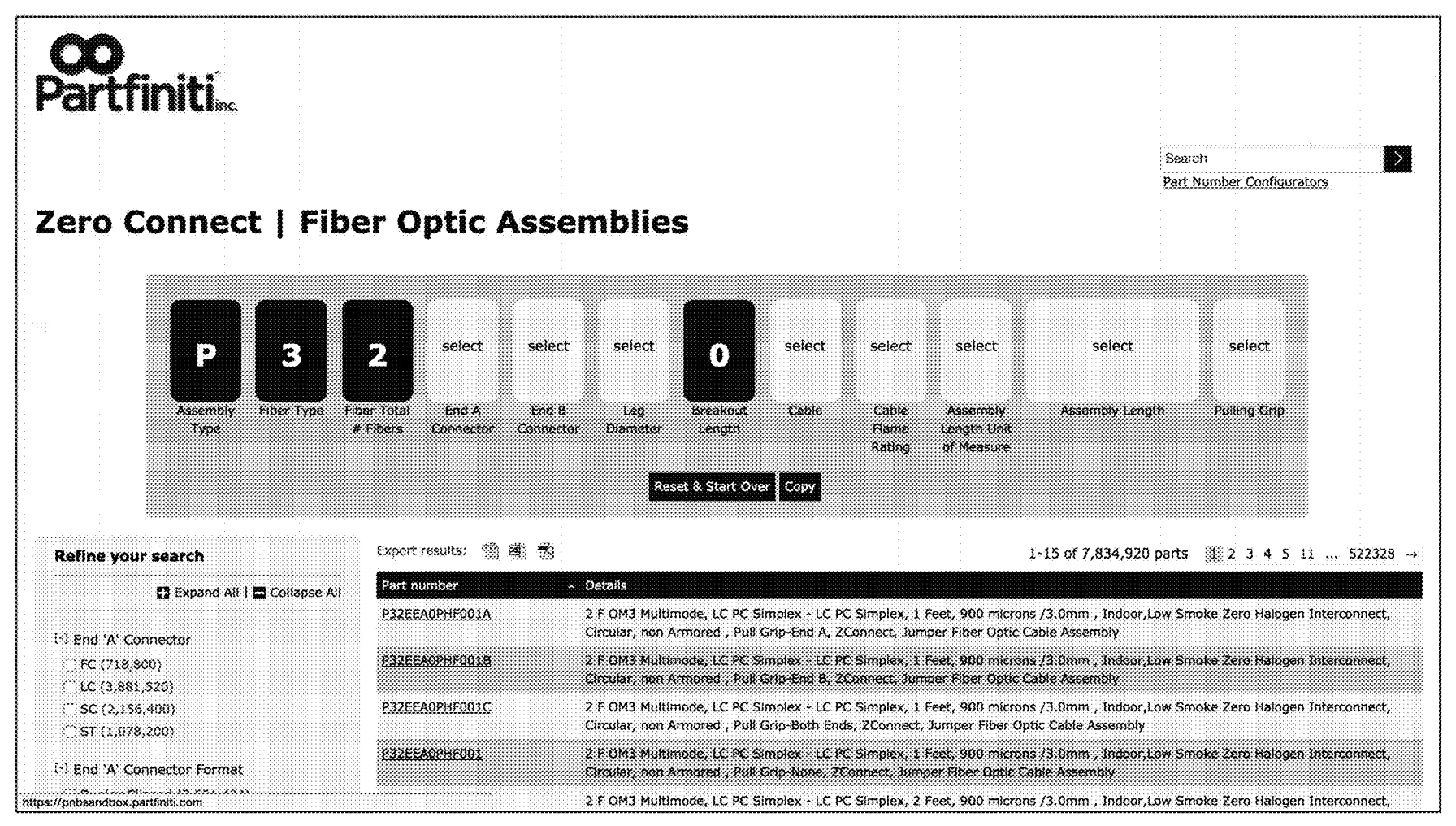
Figure 12E:
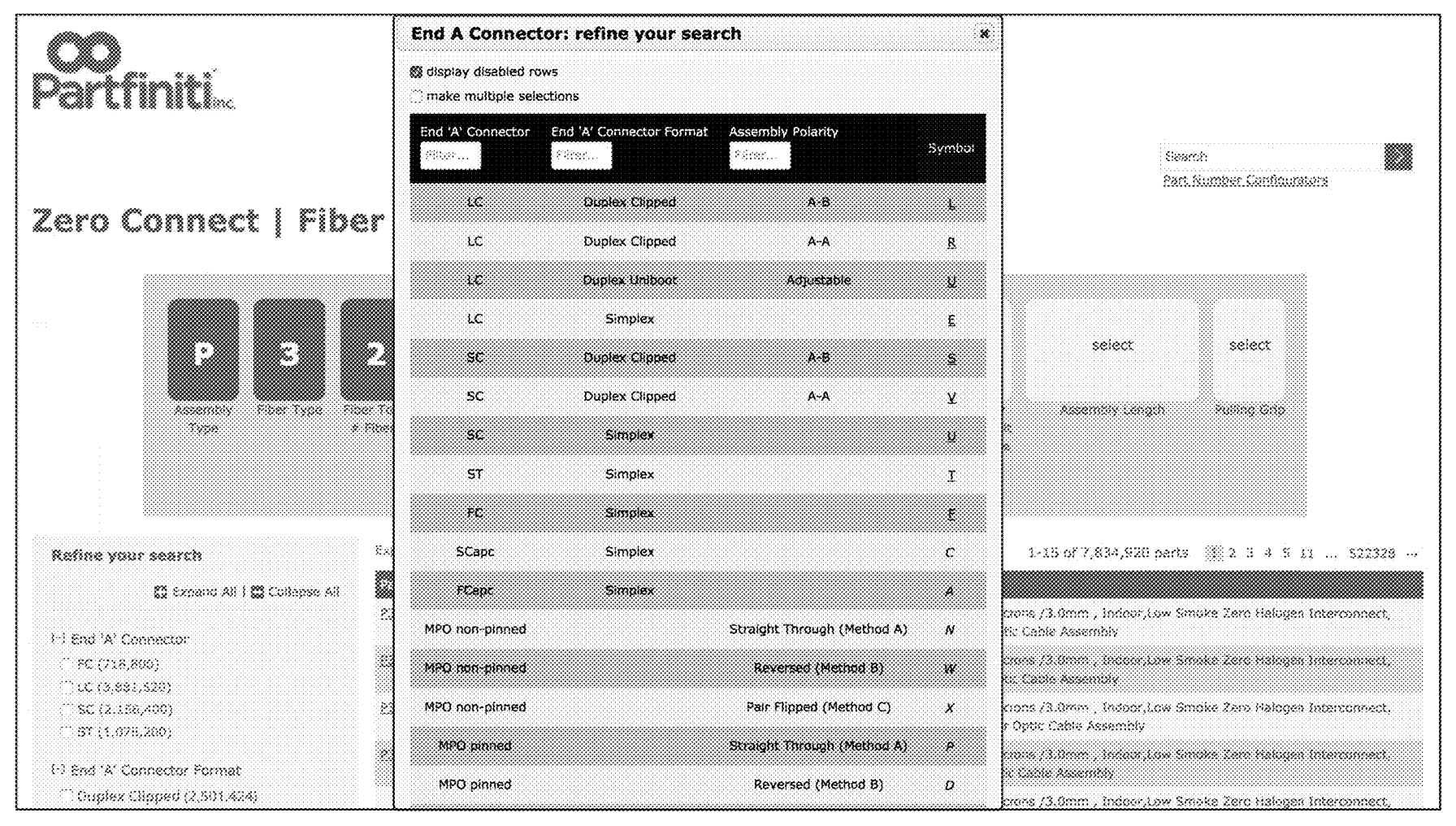
Figure 12F:
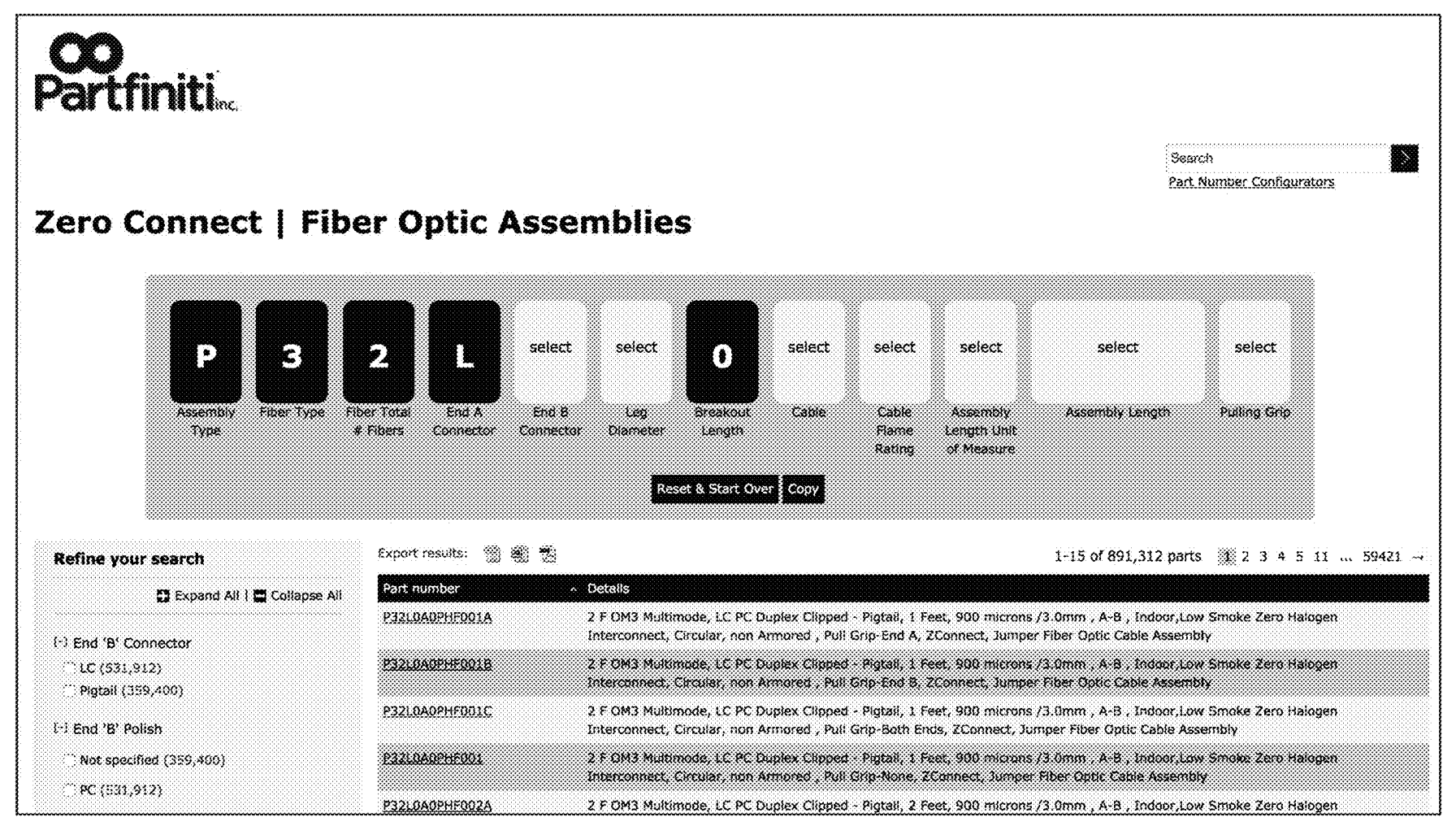
Figure 12G:
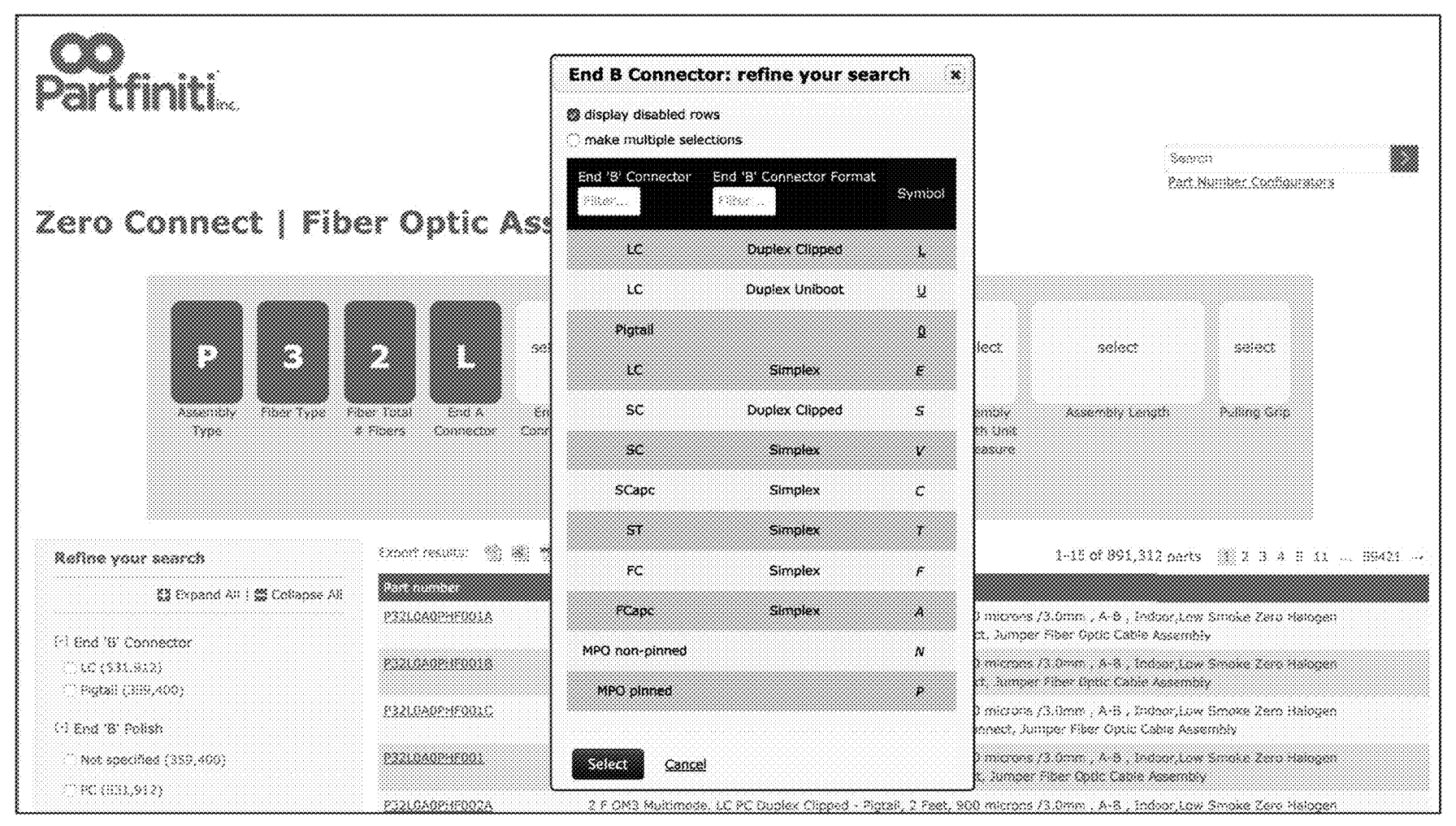
Figure 12H:
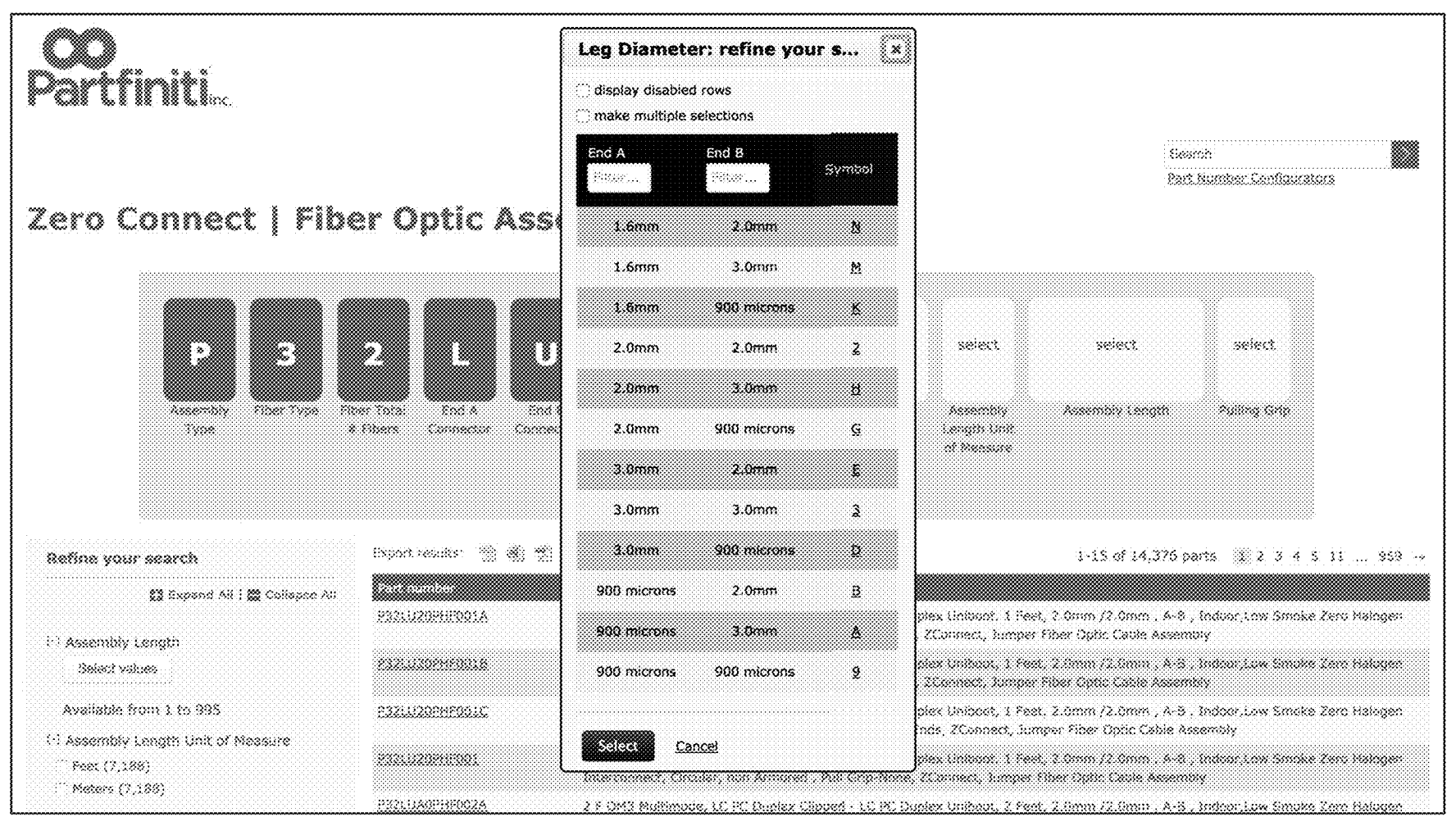
Figure 12I:
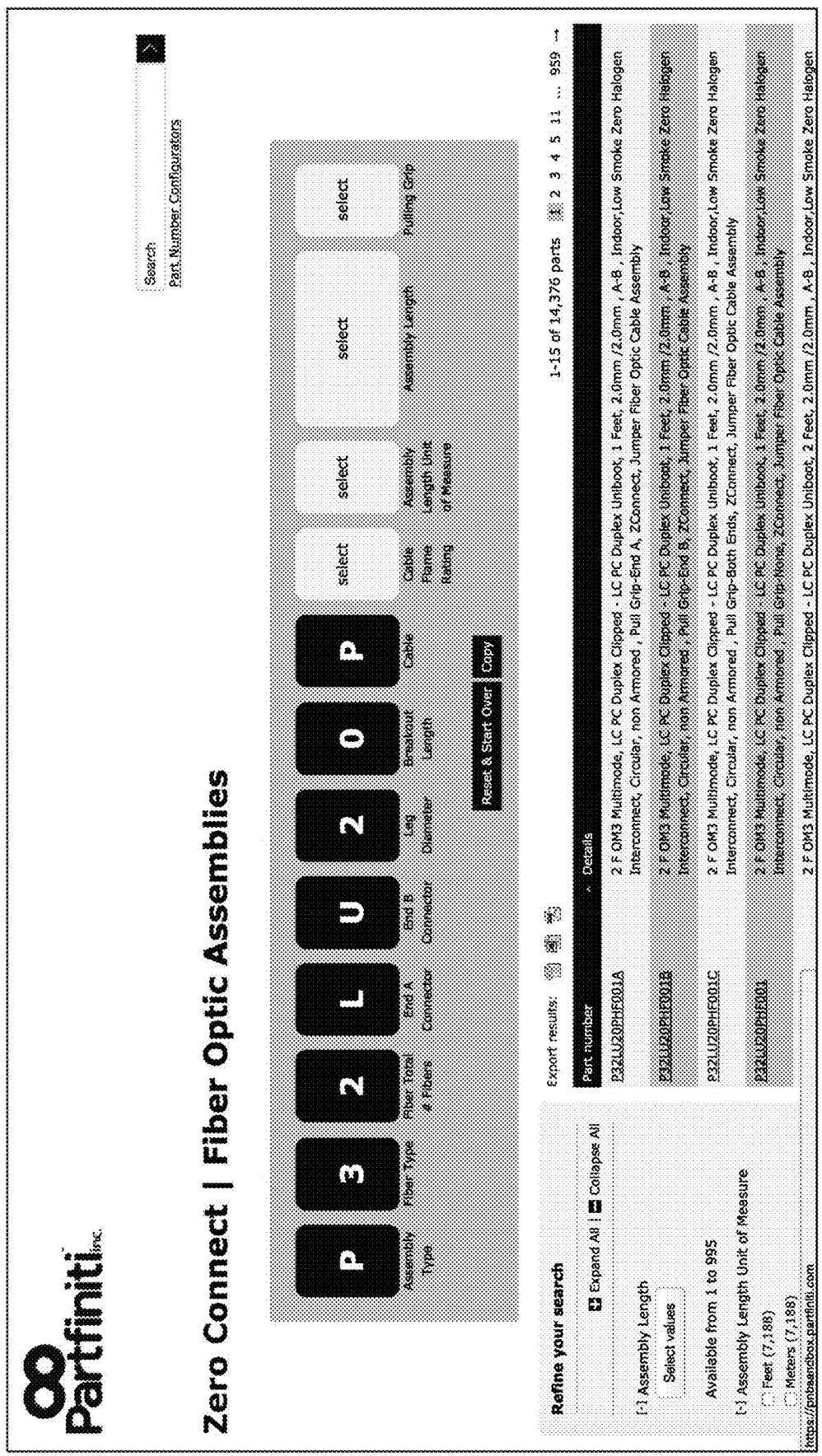
Figure 12J:
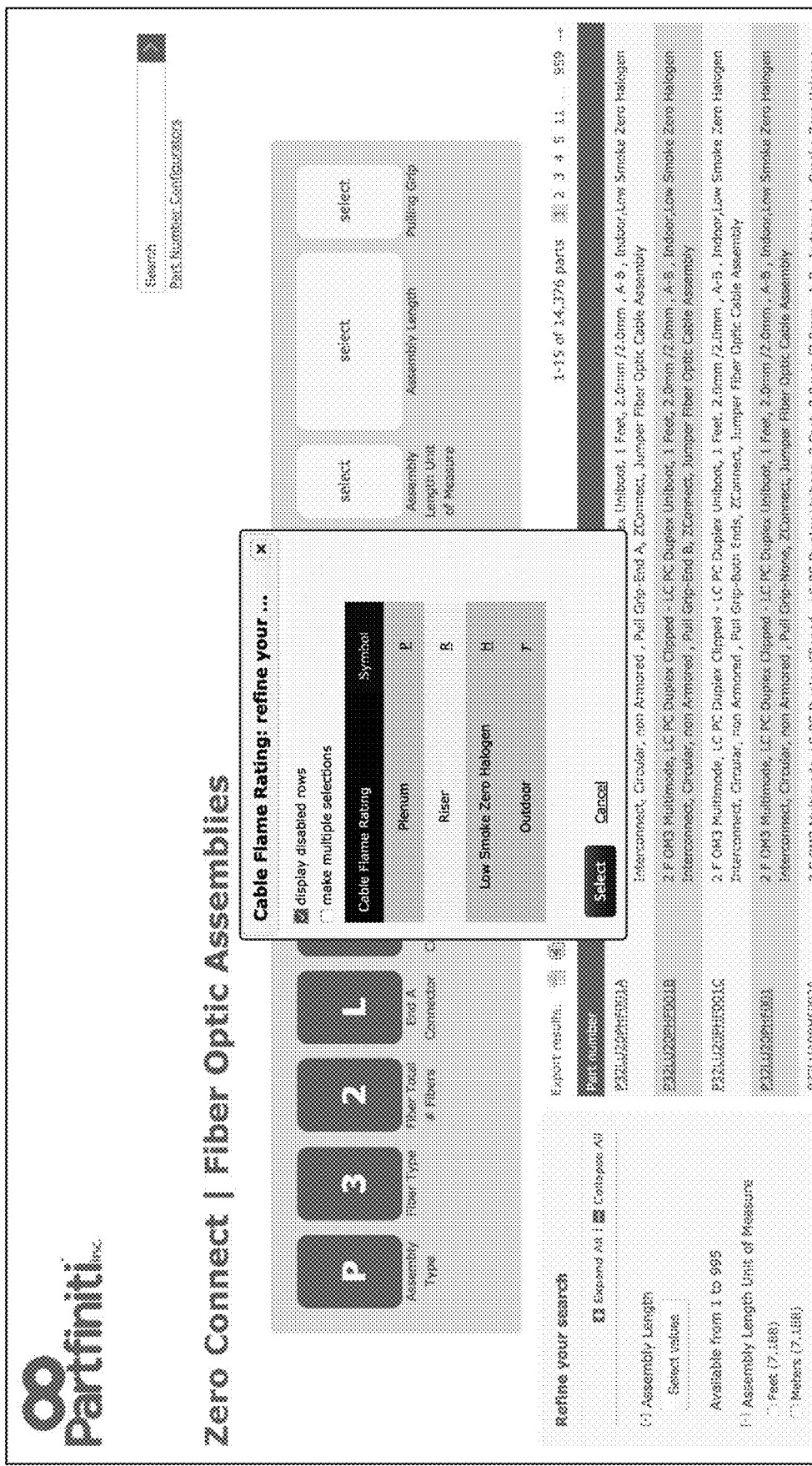
Figure 12K:
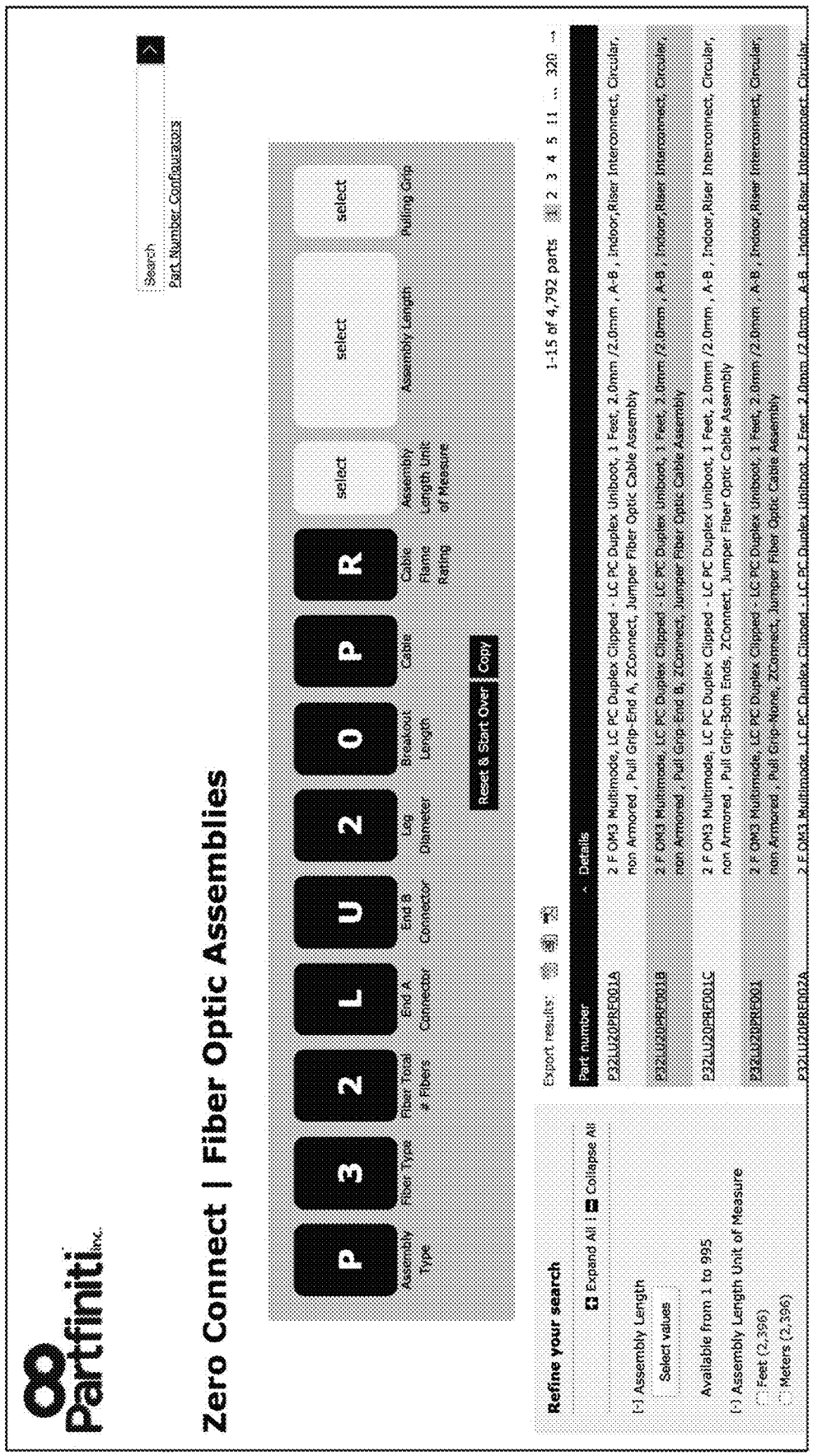
Figure 12L:
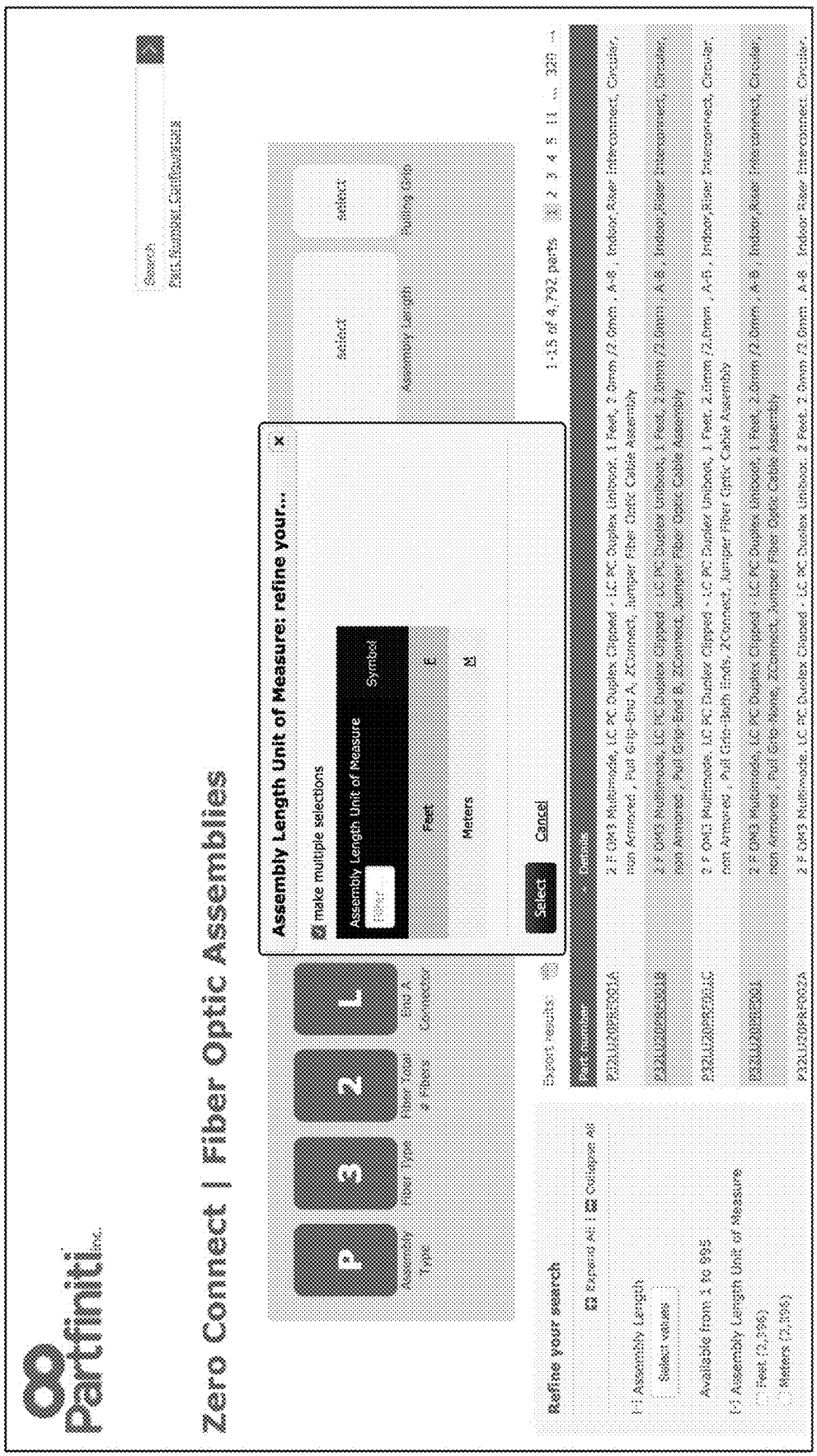
Figure 12M:
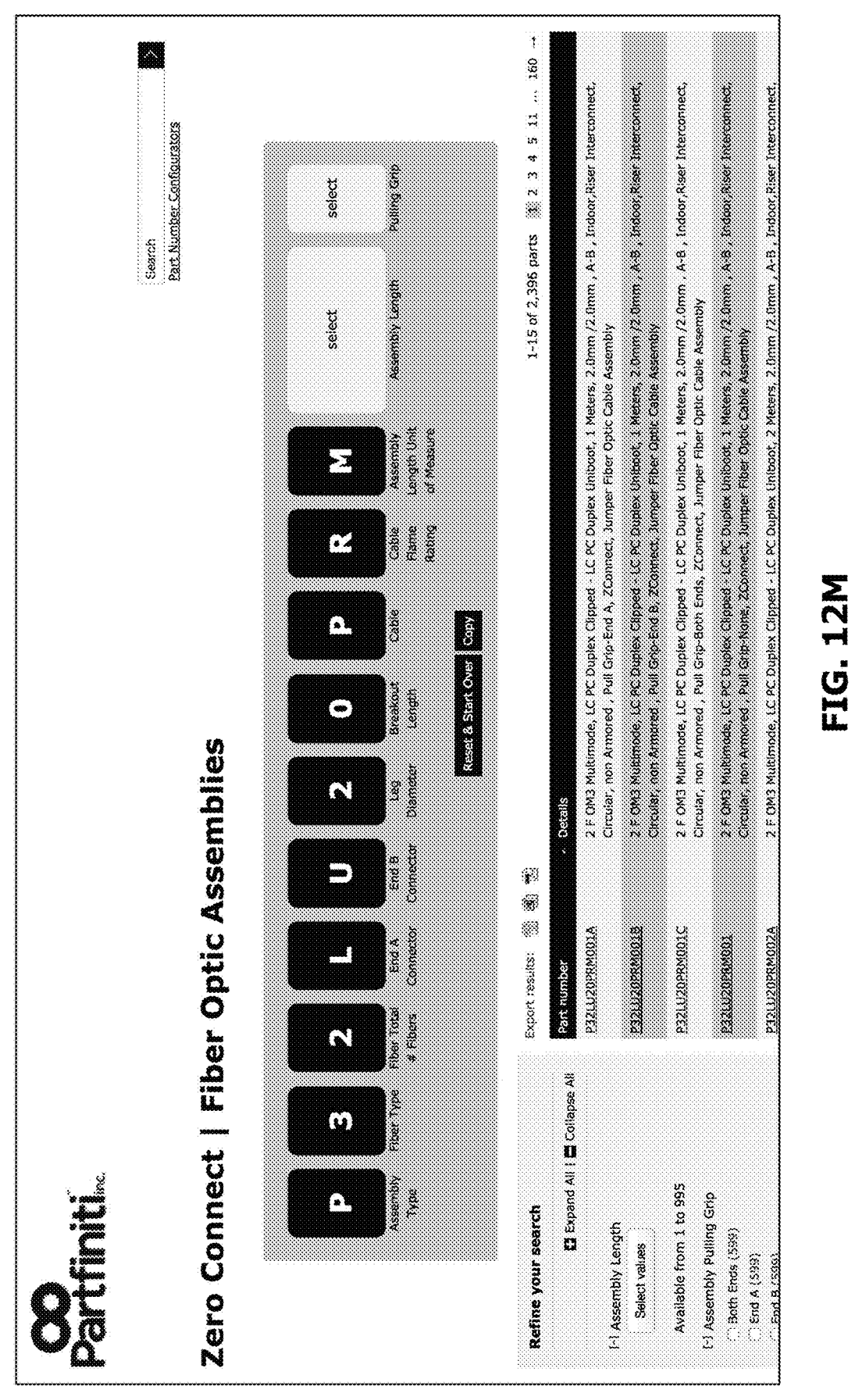

As shown in FIG. 12A, before any configuration selections are made, a total of 49,737,193,488 possible parts are available for the fiber optic assemblies. The user interface is able to provide this information on the fly based on the part generation rules provided in the data store. The part generation rules are implemented in the virtual families including the independent groups. Facet searches can easily be performed based on the information in the independent groups of the virtual families. As the user makes selections of product configurations, the part numbers of products matching the configuration selections are updated in real time. For example, as shown in FIG. 12C, after the user selects the assembly type, fiber type, and the breakout length, the number of parts matching this configuration is updated to include 10,135,080 parts.

The list of product numbers corresponding to the set of selected options may provide product numbers matching the results without having to complete or almost complete all of the option selections (i.e., define a complete the part number or a base of the part number). The results can be displayed from the start of the user interface before any selections are made and are updated as the user makes additional selections.

As shown in FIGS. 12A-12R as the user makes selection facet counts may provide a breakdown or summary of the results based on some remaining configurable options. For example, as shown in FIG. 12B, after selecting Assembly type P and breakout length 0, the facet counts may be provided based on "total number of fibers" and "fiber name." The results may include the number of part number in each of the configuration option. While not shown in FIG. 12B, the results may be provided for each remaining options that has not been defined.

The user may manually enter a symbol for one or more configurable options. For example, the user may manually enter a number of fibers or a length desired in the fiber optic assembly. The user may also be provided with an interface for selecting the configuration for one or more features of the product. For example, as shown in FIG. 12E, in response to selecting "End A Connector," the user may be displayed a selection box with "End A Connector" types that can be selected by the user. The selection box may display both selectable type of connectors and connector types that are not selectable in view of the already selected other configurations of the product. The not selectable type of connectors may be displayed as disabled rows.

The user is not restricted to select the product configuration in any specific order. The user may configure the product in any order and based on the already selected options, the available options for not yet selected configurations of the product may be updated in real time. The available options for not selected configurations may be obtained from virtual families with features matching the current selections. This is possible to do on the fly because the constraints and particulars are already considered in the generated virtual families and independent groups.

Figure 12N:
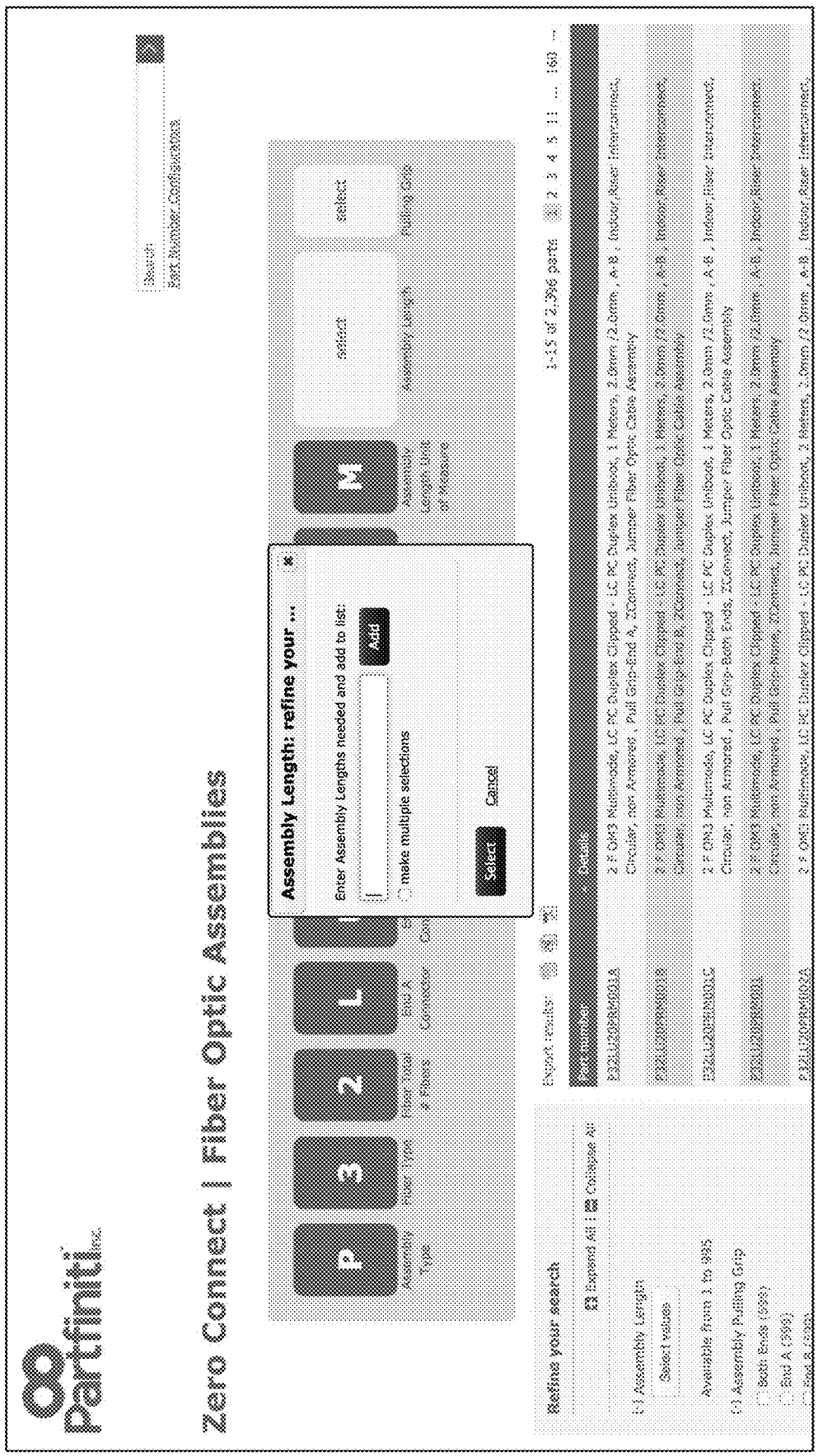
Figure 12P:
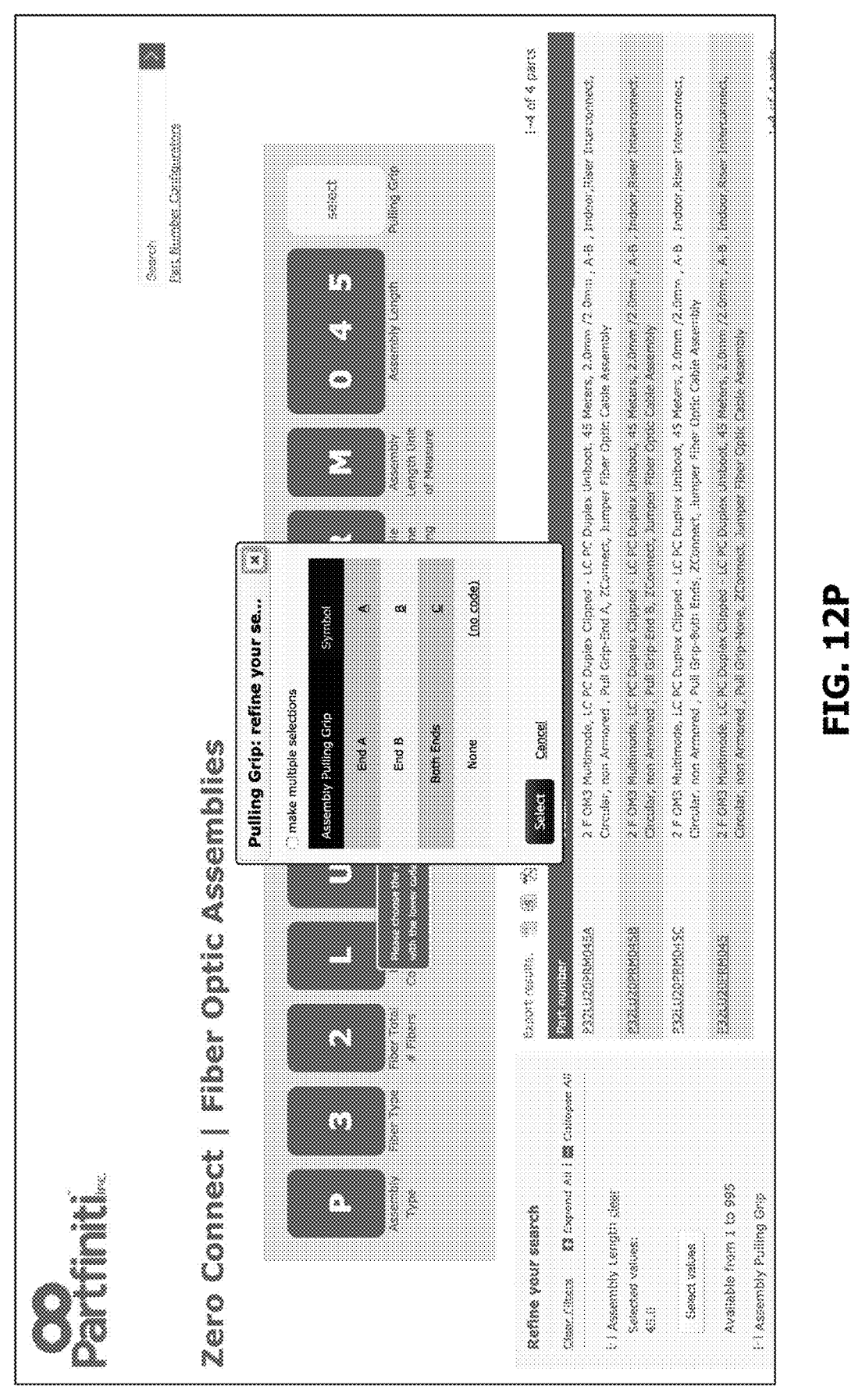

For one or more configurable options, the user may be provided with the ability to make multiple selections. For example, as shown in FIG. 12N, the user may select multiple values for the assembly lengths. The user may select a length of 45 meters and 55 meters. With these two selections, part numbers for both length may be displayed.

Figure 12Q:
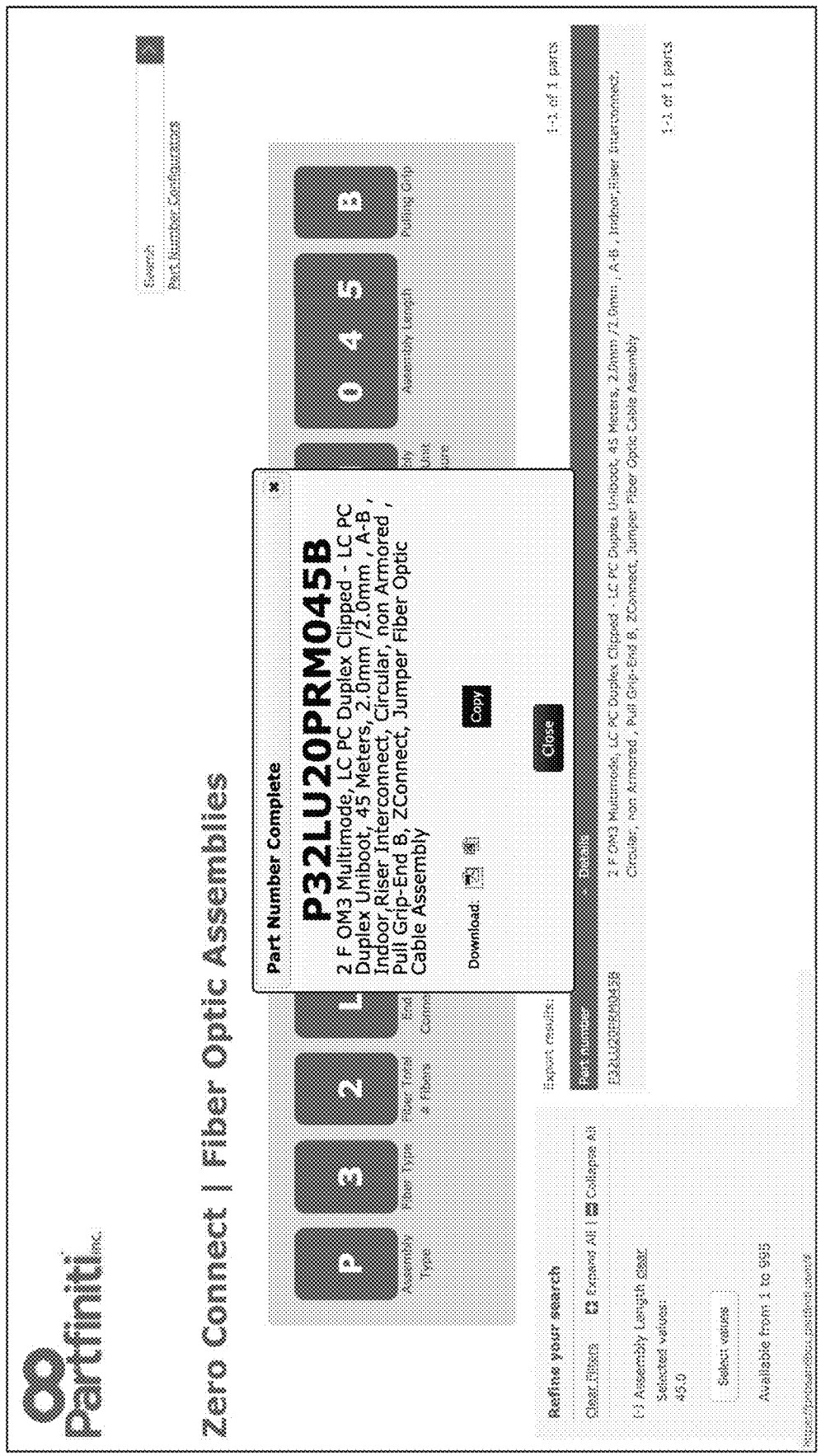
Figure 12R:
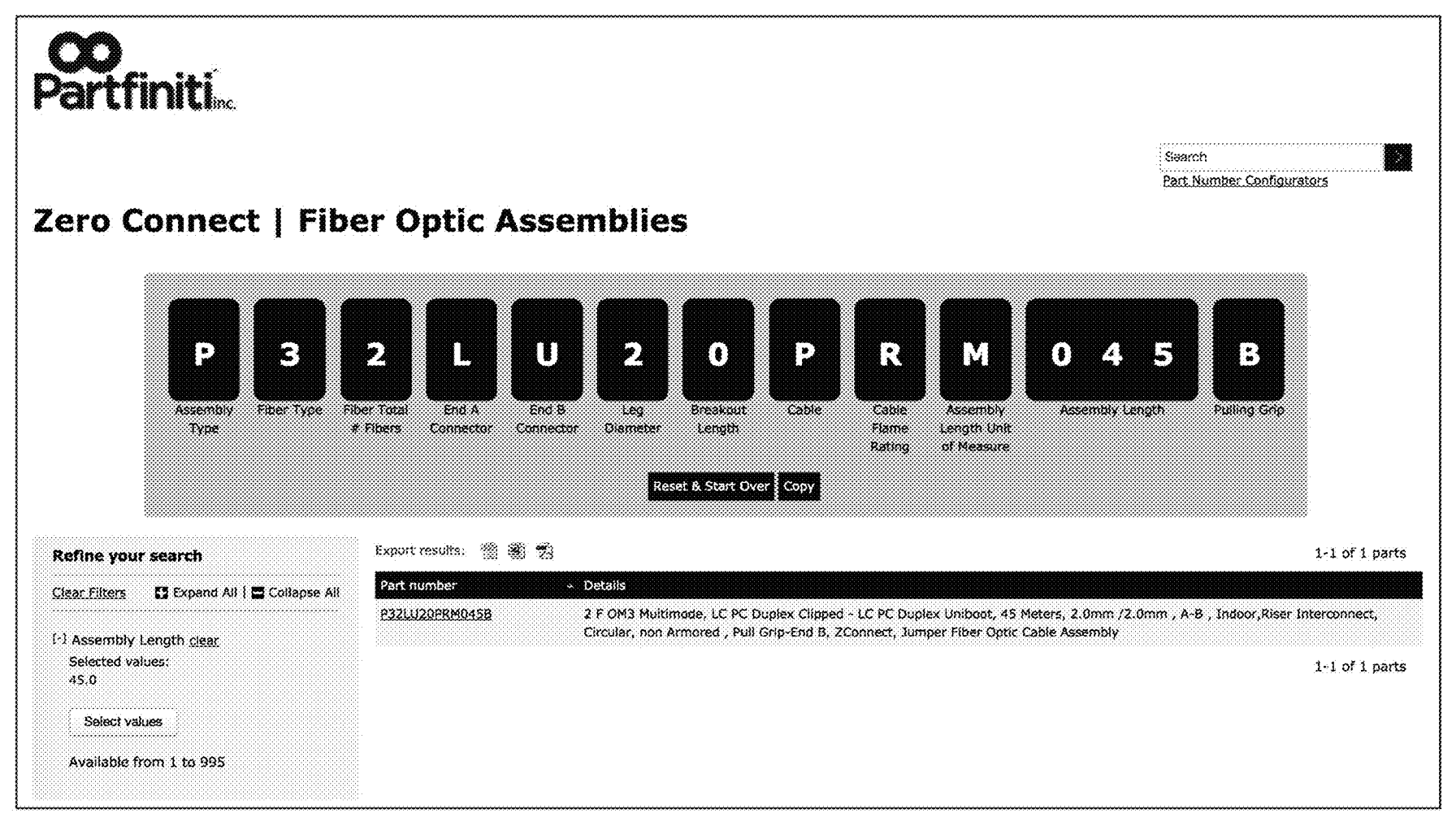

At any time during the selection of the configurable options, the user may select one of the displayed part number to obtain more information on the product. As shown in FIG. 12Q, when the product is selected or when the part number is completed, a user may be displayed a summary of the product details and with options to obtain additional information for the product (e.g., in a PDF file or an Excel file). While not shown in FIGS. 12A-12R, the user interface may display images of the configured product and/or of the selectable features. The images may be generated based on CAD drawings and or real images of the configurable product or features. The images may be associated with the virtual families of the configurable product.

FIG. 12R illustrates a part number with all of the configurable options selected. The user can reset and start over the selection of the configurable options at any time during the selection process. In addition, the user may go back and make changes to any one of the selected configurations.

As shown in FIGS. 12A-12R, the user may perform enter a search string in the search dialog box to return parts matching the search string. The search string may be parsed and return part numbers from virtual families containing the matching results. With the results, one or more of the configurable selections may be automatically selected based on the search results. For example, if the user enters a search string of "number of fibers 2," the number of fibers in the configuration selection area may be automatically selected.

It will be appreciated that as used herein, the terms system, subsystem, service, engine, module, programmed logic circuitry, and the like may be implemented as any suitable combination of software, hardware, firmware, and/or the like. It also will be appreciated that the storage locations, stores, and repositories discussed herein may be any suitable combination of disk drive devices, memory locations, solid state drives, CD-ROMs, DVDs, tape backups, storage area network (SAN) systems, and/or any other appropriate tangible non-transitory computer readable storage medium. Cloud and/or distributed storage (e.g., using file sharing means), for instance, also may be used in certain example embodiments. It also will be appreciated that the techniques described herein may be accomplished by having at least one processor execute instructions that may be tangibly stored on a non-transitory computer readable storage medium.

In the above description, numerous specific details are set forth to provide a thorough understanding of embodiments of the disclosure. One skilled in the relevant art will recognize, however that the various embodiments can be practiced without one or more of the specific details or with other methods, components, techniques, etc. In other instances, well-known operations or structures are not shown or described in detail to avoid obscuring aspects of the disclosure.

Although the processes illustrated and described herein include series of steps, it will be appreciated that the different embodiments of the present disclosure are not limited by the illustrated ordering of steps, as some steps may occur in different orders, some concurrently with other steps apart from that shown and described herein. In addition, not all illustrated steps may be required to implement a methodology in accordance with the present disclosure. Moreover, it will be appreciated that the processes may be implemented in association with the apparatus and systems illustrated and described herein as well as in association with other systems not illustrated.

The above descriptions and illustrations of embodiments of the disclosure, including what is described in the Abstract, is not intended to be exhaustive or to limit the embodiments to the precise forms disclosed. While specific embodiments of, and examples for, the embodiments are described herein for illustrative purposes, various equivalent modifications are possible within the scope of the disclosure, as those skilled in the relevant art will recognize.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims. These modifications can be made to the embodiments in light of the above detailed description.

What is claimed is:

1. A computer implemented method for building a configurable product data store, the method comprising:
    receiving specification information for a configurable product, the specification information including a plurality of symbol groups for the configurable product, at least one constraint involving at least one symbol group, and at least one conditional particular for at least one symbol group, wherein the symbol groups define a format of a part number of the configurable product and each symbol group includes one or more part number positions of the part number for characters, number and/or symbols corresponding to configurable properties of the configurable product;
    based on the specification information, generating a plurality of independent groups, each independent group including part number positions for characters, number and/or symbols that do not depend on characters, number and/or symbols at part number positions of other independent groups, wherein generating the plurality of independent groups includes:
        generating an independent group for each symbol group;
        merging independent groups having the same configurable properties to form a new independent group; and
        merging independent groups dependent on each other based on the at least one constraint, wherein the dependent independent groups are merged to form a new independent group; and
    when multiple lengths of the part number positions can be generated from the generated independent groups including at least one of the merged independent groups, generating a plurality of virtual families, wherein each virtual family of the plurality of virtual families includes a plurality of generated independent groups such that each respective virtual family provides characters, number and/or symbols for part number positions that are of a same length; and
    storing the virtual families in a database.

2. The computer implemented method of claim 1, wherein the symbol groups include a code table type symbol group and a field type symbol group, the code table type symbol group including a plurality of codes corresponding to the part number positions of the code table type symbol group, each code defining a plurality of configurable properties of the configurable product, and the field type symbol group defines a single field corresponding to a single configurable property of the configurable product.

3. The computer implemented method of claim 2, wherein merging the independent groups having the same configurable properties to form the new independent group includes merging an independent group generated from the code table type symbol group with an independent group generated from the field type symbol group, the code table type symbol group including a configurable property that is also included in the field type symbol group.

4. The computer implemented method of claim 1, wherein generating a plurality of independent groups, includes merging independent groups dependent on each other based on the at least one conditional particular, wherein the dependent independent groups are merged to form a new independent group.

5. The computer implemented method of claim 1 further comprising:
    displaying a user interface configured to receive a user input search request for part numbers of a configurable product, and
    receiving, via the user interface, the user input search request defining one or more configurable properties of the configurable product;
    analyzing the user input search request to determine entities present in the database matching the one or more configurable properties of the user input search request;
    based on the determined entities, determining part numbers of the configurable product matching the user input search request; and
    displaying, in the user interface, a list of part numbers determined to match the user input search request.

6. The computer implemented method of claim 5 further comprising determining specifications for each part number determined to match the user input search request.

7. The computer implemented method of claim 6, wherein the specification for the part number is retrieved from a relational database based on fields stored in the independent groups associated with the generate the part number.

8. The computer implemented method of claim 5, further comprising determining facet counts providing, independent of the list of part numbers determined to match the user input search request, a breakdown of results based on multiple configurable properties of the configurable product; and
    displaying the determined facet counts in the user interface.

9. The computer implemented method of claim 5, wherein the user input search request is a search string and analyzing the user input search request includes parsing the search string.

10. The computer implemented method of claim 5, wherein the search string includes characters, number and/or symbols defining a portion of the part number.

11. A system for building a configurable product data store, the system comprising:
    a database including virtual families corresponding to a plurality of configurable products;
    a user interface configured to receive specification information for a configurable product; and
    processing resources including at least one processor and a memory, the processing resources configured to:
    receive, from the user interface, the specification information for the configurable product, the specification information including a plurality of symbol groups for the configurable product, at least one constraint involving at least one symbol group, and at least one conditional particular for at least one symbol group, wherein the symbol groups define a format of a part number of the configurable product and each symbol group includes one or more part number positions of the part number for characters, number and/or symbols corresponding to configurable properties of the configurable product; and based on the specification information, generate a plurality of independent groups, each independent group including part number positions for characters, number and/or symbols that do not depend on characters, number and/or symbols at part number positions of other independent groups, wherein generating the plurality of independent groups includes:
generating an independent group for each symbol group;
merging independent groups having the same configurable properties to form a new independent group; and
merging independent groups dependent on each other based on the at least one constraint, wherein the dependent independent groups are merged to form a new independent group; and
when multiple lengths of the part number positions can be generated from the generated independent groups including at least one of the merged independent groups, generating a plurality of virtual families, wherein each virtual family of the plurality of virtual families includes a plurality of generated independent groups such that each respective virtual family provides characters, number and/or symbols for part number positions that are of a same length; and
store the virtual families in the database.

12. The system of claim 11, wherein the symbol groups include a code table type symbol group and a field type symbol group, the code table type symbol group including a plurality of codes corresponding to the part number positions of the code table type symbol group, each code defining a plurality of configurable properties of the configurable product, and the field type symbol group defines a single field corresponding to a single configurable property of the configurable product.

13. The system of claim 12, wherein merging the independent groups having the same configurable properties to form the new independent group includes merging an independent group generated from the code table type symbol group with an independent group generated from the field type symbol group, the code table type symbol group including a configurable property that is also included in the field type symbol group.

14. The system of claim 11, wherein generating a plurality of independent groups, includes merging independent groups depending on each other based on the at least one conditional particular, wherein the dependent independent groups are merged to form a new independent group.

15. A non-transitory computer readable storage medium having a program for building a configurable product data store, the program comprising instructions that, when executed, cause a computing system including at least one processor and a memory to at least:
receive specification information for a configurable product, the specification information including a plurality of symbol groups for the configurable product, at least one constraint involving at least one symbol group, and at least one conditional particular for at least one symbol group, wherein the symbol groups define a format of a part number of the configurable product and each symbol group includes one or more part number positions of the part number for characters, number and/or symbols corresponding to configurable properties of the configurable product;

based on the specification information, generate a plurality of independent groups, each independent group including part number positions for characters, number and/or symbols that do not depend on characters, number and/or symbols at part number positions of other independent groups, wherein generating the plurality of independent groups includes:
generating an independent group for each symbol group;
merging independent groups having the same configurable properties to form a new independent group; and
merging independent groups dependent on each other based on the at least one constraint, wherein the dependent independent groups are merged to form a new independent group; and
when multiple lengths of the part number positions can be generated from the generated independent groups including at least one of the merged independent groups, generating a plurality of virtual families, wherein each virtual family of the plurality of virtual families includes a plurality of generated independent groups such that each respective virtual family provides characters, number and/or symbols for part number positions that are of a same length; and
store the virtual families in a database.

16. The non-transitory computer readable storage medium of claim 15, wherein the symbol groups include a code table type symbol group and a field type symbol group, the code table type symbol group including a plurality of codes corresponding to the part number positions of the code table type symbol group, each code defining a plurality of configurable properties of the configurable product, and the field type symbol group defines a single field corresponding to a single configurable property of the configurable product.

17. The non-transitory computer readable storage medium of claim 16, wherein merging the independent groups having the same configurable properties to form the new independent group includes merging an independent group generated from the code table type symbol group with an independent group generated from the field type symbol group, the code table type symbol group including a configurable property that is also included in the field type symbol group.

18. The non-transitory computer readable storage medium of claim 15, wherein generating a plurality of independent groups, includes merging independent groups dependent on each other based on the at least one conditional particular, wherein the dependent independent groups are merged to form a new independent group.

19. The non-transitory computer readable storage medium of claim 15, wherein the program further comprising instructions that, when executed, cause the computing system to at least:
display a user interface configured to receive a user input search request for part numbers of a configurable product, and
receive, via the user interface, the user input search request defining one or more configurable properties of the configurable product;
analyze the user input search request to determine entities present in the database matching the one or more configurable properties of the user input search request;
based on the determined entities, determine part numbers of the configurable product matching the user input search request; and display, in the user interface, a list of part numbers determined to match the user input search request.

20. The non-transitory computer readable storage medium of claim 19, wherein the program further comprising instructions that, when executed, cause the computing system to at least:
determine specifications for each part number determined to match the user input search request; and
display, in the user interface, the determined specifications.

* * * * *